(12) United States Patent
Miles

(10) Patent No.: US 9,500,746 B2
(45) Date of Patent: Nov. 22, 2016

(54) TRACKING DEVICE

(71) Applicant: Guidance Navigation Limited, Leicestershire (GB)

(72) Inventor: Russ Miles, Leicestershire (GB)

(73) Assignee: GUIDANCE NAVIGATION LIMITED, Leicestershire (GB)

( * ) Notice: Subject to any disclaimer, the term of this patent is extended or adjusted under 35 U.S.C. 154(b) by 224 days.

(21) Appl. No.: 14/514,067

(22) Filed: Oct. 14, 2014

(65) Prior Publication Data
US 2015/0102956 A1    Apr. 16, 2015

(30) Foreign Application Priority Data
Oct. 14, 2013  (GB) .................................. 1318185.4

(51) Int. Cl.
| G01S 13/06 | (2006.01) |
| G01S 13/89 | (2006.01) |
| G01S 17/66 | (2006.01) |
| G01S 17/89 | (2006.01) |
| G05D 1/02  | (2006.01) |

(52) U.S. Cl.
CPC ................ G01S 13/06 (2013.01); G01S 13/89 (2013.01); G01S 17/66 (2013.01); G01S 17/89 (2013.01); G05D 1/0206 (2013.01)

(58) Field of Classification Search
CPC ........ G01S 13/06; G01S 13/89; G01S 17/66; G01S 17/89; G05D 1/0206
USPC .......................................................... 342/73
See application file for complete search history.

(56) References Cited

U.S. PATENT DOCUMENTS

| 8,473,144 | B1 | 6/2013 | Dolgov et al. |
| 8,704,887 | B2* | 4/2014 | Zeng ..................... G01S 13/726 |
| | | | 348/135 |
| 2006/0293854 | A1* | 12/2006 | Chiou ....................... G01S 7/40 |
| | | | 701/301 |
| 2007/0219720 | A1 | 9/2007 | Trepagnier et al. |
| 2008/0177427 | A1 | 7/2008 | Marty et al. |
| 2010/0208244 | A1 | 8/2010 | Earhart et al. |

FOREIGN PATENT DOCUMENTS

| EP | 1615051 A1 | 1/2006 |
| GB | 2246261 A  | 1/1992 |
| GB | 2449517 A  | 11/2008 |

(Continued)

OTHER PUBLICATIONS

British Search Report Search Report, Apr. 15, 2015, GB 1418205.9, 5 pages.

(Continued)

*Primary Examiner* — Timothy A Brainard

(57) ABSTRACT

A targetless tracking device has a detector configured to receive scattered radiation indicative of the presence of an object. The device also has a processor which is configured to calculate a positional relationship between the device and the object based on the scattered radiation, receive an indication of a desired positional relationship to the object, and output an error signal indicative of the positional relationship versus the desired positional relationship so that the device position is able to be controlled to reduce the error signal. The processor creates first and second images at first and second points in time, respectively, and compares the first and second images in order to calculate the positional relationship.

17 Claims, 11 Drawing Sheets

(56) References Cited

FOREIGN PATENT DOCUMENTS

| KR | 20130099667 A | 9/2013 |
| WO | WO 2013/069012 A1 | 5/2013 |

OTHER PUBLICATIONS

European Search Report Search Report, Apr. 1, 2015, EP 14188915.4, 3 pages.

European Search Report Search Report, Apr. 2, 2015, EP 14188908.9, 4 pages.

European Search Report Search Report, Mar. 31, 2015, EP 14177811.3, 3 pages.

Olson, "Real-Time Correlative Scan Matching," IEEE International Conference on Robotics and Automation (ICRA), May 12-17, 2009, pp. 4387-4393.

Ruel et al., "On-Orbit Testing of Target-less TRiDAR 3D Rendezvous and Docking Sensor," The International Symposium on Artificial Intelligence, Robotics and Automation in Space (I-SAIRAS), Sep. 1, 2010, pp. 15-21.

GB Search Report Under Section 17, Jul. 17, 2014, GB1318185.4, 1 page.

* cited by examiner

TRACKING DEVICE

CROSS-REFERENCE TO RELATED APPLICATION

This application claims priority to and the benefit of application No. GB 1318185.4, filed Oct. 14, 2013, having the same Title, which is hereby incorporated by reference in its entirety.

FIELD OF THE INVENTION

The invention relates to a tracking device for targetless tracking. Specifically, the invention relates to targetless radar tracking. Targetless tracking may find use in marine tracking

BACKGROUND OF THE INVENTION

Radar systems can be used to track objects. However, the resolution with which a radar system can track an object is limited to the size of the object, that is to say, radar systems cannot track an object to a resolution which is finer than the size of the object.

One technique for improving the resolution of radar tracking is to place a radar target, called a responder, on the tracked object. A device accurately measures the range and bearing to the responder to calculate the relative position and heading of the object relative to the device. Using a responder improves the resolution with which the object can be tracked.

Radar tracking using responders is often used in a marine environment, for example, on offshore oil-platforms where a responder is placed on the oil-platform and a device on a vessel monitors the responder on the oil-platform to allow the vessel to maintain a safe distance from the oil-platform. Responders are also used in pipe or cable laying operations where convoys of vessels involved in the pipe or cable laying follow one another, for example, a supply ship containing a supply of pipes has a device which monitors a responder on a pipe laying vessel to ensure that the pipe laying vessel and the supply ship remain in convoy, so that the pipe laying vessel can reliably use a crane to pick the pipes up from the supply ship.

A disadvantage with using responders is that a responder must be fitted to every vessel that might be tracked at some point in the future. This requires that the desire to track the vessel is predicted in advance so that a responder can be fitted. Inevitably this will mean that some vessels that one wishes to track will not have a responder fitted, or might have a responder from a different manufacturer fitted which is not compatible with the device, leading to delays while an appropriate responder is fitted. In other cases, vessels may have a responder fitted but never be tracked which wastes time and money involved in fitting an unused responder.

It would, therefore, be advantageous to find a way of tracking an object to high resolution without the need to use a responder.

SUMMARY OF INVENTION

According to a first aspect of the invention, there is provided a targetless tracking device comprising a detector configured to receive scattered radiation indicative of the presence of an object. The device also comprises a processor configured to calculate a positional relationship between the device and the object based on the scattered radiation, receive an indication of a desired positional relationship of the detector relative to the object, and output an error signal indicative of the positional relationship versus the desired target distance so that the device position is able to be controlled to reduce the error signal. The processor is further configured to create first and second images at first and second points in time, respectively, and then compare the first and second images in order to calculate the positional relationship.

The fact that the processor is further configured to generate first and second images at first and second points in time, respectively, and then compare the first and second images in order to calculate the positional relationship, means that the device can determine the positional relationship between the device and an object without the need for a responder or target to be placed on the object.

In a particularly preferred embodiment, the scattered radiation is either from a radar and the first and second images are radar images; or the scattered radiation is from a lidar and the first and second images are lidar images.

An advantage of using radar is that radar operates better in a wider range of weather conditions, such as rain or fog, than optical imaging techniques. Radar and lidar are also able to operate over a longer range than optical imaging techniques.

A further advantage of radar and lidar is that radar and lidar provide much better distance perception than optical imaging, even compared with optical imaging using a stereo camera. This is because radar and lidar provide images of a scene which is an orthographic projection from above, most analogous to an infinitely high optical camera looking down on the scene, which makes it much easier to calculate positional relationships from the radar and lidar images. In contrast, an optical camera attached to a vessel is unable to provide the same angle of view, even if the optical camera is attached to a high point on the vessel as the camera is not sufficiently high above the vessel, which means that it is difficult to calculate positional relationships, particularly distance, from images from an optical camera.

The source of the scattered radiation from the radar may be an antenna, for example, a dipole, horn or parabolic dish reflector, or a phased array. The detector may be an antenna with the same or different properties as the source. The scattered radiation may be radiofrequency radiation: microwaves or radio waves. The scattered radiation may be from a frequency-modulated continuous-wave (FMCW) radar.

The source of the scattered radiation from the lidar may be a laser. The detector may be a photodetector, such as a photomultiplier tube or an avalanche photodiode. The electromagnetic radiation may be visible light or infrared light.

The electromagnetic radiation is either: pulsed, or frequency-modulated continuous-wave, or chirped, being frequency modulated and pulsed. The fact that the electromagnetic radiation is pulsed or frequency-modulated continuous-wave, or chirped, allows for the range to an object to be determined.

The first and second images may be compared by scan-matching. Scan-matching is advantageous over other techniques for calculating the positional relationship, such as algorithms that only use lines and edges. This is because scan-matching, particularly dense scan-matching which compares the whole of the first and second images, makes optimal use of all of the information in the first and second images, which makes scan-matching robust and less prone to errors, and allows scan-matching to operate in complex scenes, for example scenes which do not have strong lines or edges such as outdoor scenes containing features like vegetation.

Scan-matching may comprise selecting part of the second image based on a predicted location of the object in the second image. Preferably, adjusting the second image to match the first image.

A prediction error relating to the positional relationship may be calculated by optimising a function between the second image and the first image. The function may be a correlation between the second image and the first image.

The predicted location, or estimated change in separation distance, bearing and/or relative orientation may be generated using an estimator such as a state observer which may comprise one of a fixed gain state observer, a particle filter and a Kalman filter. The estimator may take a current speed of the device as a parameter. The current speed of the device may be related to the current speed of a vessel to which the device is attached.

Creating first and second images may comprise calculating a spatial power spectral density of the intensity of the scattered radiation.

The processor may be configured to select the object. For example, the processor may select the object based on a user selection, for example, by a user tapping an image representing the object on a touch screen, or drawing a bounding box around an image of the object on a screen. Alternatively, the processor may select the object based on the fact that the object is the only object in the scene, or based on the fact that the object is the largest object in the scene or based on the fact that the object is scattering or reflecting the greatest amount of electromagnetic radiation, or based on the fact that the object has an intensity above a threshold.

The processor may be configured to select a sub-region of one of the first and second images. The sub-region may be selected based on a user selection, or the processor may select the object based on a parameter, such as selecting a sub-region containing the only object in the scene, or selecting a sub-region containing the largest object in the scene, or selecting a sub-region containing the object scattering or reflecting the greatest amount of electromagnetic radiation, or selecting a sub-region containing the object which has an intensity above a threshold. Selecting a sub-region reduces computational resources, such as processor and memory requirements, which are necessary to perform the calculation of the positional relationship as the whole image need not be processed. Selecting a sub-region may also eliminate other objects from the sub-region which might otherwise interfere with the calculation of the positional relationship, or reduce the accuracy with which the positional relationship is calculated.

The sub-region may be selected so that the object fills a majority of the sub-region. Selecting a sub-region where the object fills the majority of the sub-region improves the accuracy of the calculation of separation distance and prevents the device from erroneously calculating the separation distance to a further object, rather than to the object.

The sub-region may be selected so that the sub-region contains no further object which moves relative to the object. Further objects which move relative to the object may reduce the accuracy of the calculation of separation distance and may cause the calculation of the separation distance to erroneously calculate the separation distance to the further object rather than calculating the separation distance to the object.

The processor may be configured to display the sub-region to a user, receive input from the user, and calculate the positional relationship in response to receiving the input from the user. This is advantageous because the processor and the user can work together to ensure that a correct object and optimum sub-region are selected. For example, the processor may select a sub-region based on analysis of one or more images, so the processor may be able to select a sub-region based on information that is not immediately apparent to the user, which may lead to the processor picking a more optimum sub-region that the user would have picked. However, it is possible that the processor may sometimes pick an incorrect object to track, such as an object the user was not intending to track. By displaying to the user the sub-region containing the object the processor has selected and waiting for conformation from the user before proceeding with calculating the positional relationship, the selection by the processor can be confirmed. In this way, the processor and user can work together to optimise the selection of an optimum sub-region.

The processor may be further configured to compare the first and second images in order to calculate one or more of a separation distance, a bearing or relative orientation between the device and the object based on the scattered radiation, and wherein the desired positional relationship is an equivalent one or more of a desired separation distance, desired relative orientation or desired bearing of the detector relative to the object. This allows the heading of the device to be matched to the heading of the object, or the heading of the device to be offset by a desired amount relative to the heading of the object. Preferably, the positional relationship and desired positional relationship is a separation distance.

The targetless tracking device may further comprise a dynamic positioning system configured to control a propulsion system to move a vessel towards the target distance based on the error signal.

The object may be a vessel, such as any kind of sea vessel, for example a ship, boat, tanker, ferry or hovercraft. Alternatively, the object may be a vehicle, such as a car, van, lorry, truck, bus, coach or motorcycle. Alternatively, the object may be a aircraft, or a submarine. Alternatively, the object may be an oil rig, buoy or other platform tethered at sea.

According to a second aspect of the invention, there is provided a method of targetless tracking. The method comprises receiving scattered radiation at a detector, wherein the scattered radiation is indicative of the presence of an object. The method further comprises using a processor to calculate a positional relationship between the detector and the object based on the scattered radiation, receive an indication of a desired positional relationship of the detector relative to the object; and generate an error signal indicative of the positional relationship versus the target positional relationship so that the detector position is able to be controlled to reduce the error signal. The method further comprises using a processor to create first and second images at first and second points in time, respectively, and then to compare the first and second images in order to calculate the positional relationship. The fact that the method further comprises creating first and second images at first and second points in time, respectively, and then comparing the first and second images in order to calculate the positional relationship means that the positional relationship between a vessel, or vehicle, and an object can be determined without the need for a responder or target to be placed on the object.

In a preferred embodiment, the scattered radiation is either from a radar and the first and second images are radar images; or the scattered radiation is from a lidar and the first and second images are lidar images.

An advantage of using radar is that radar operates better in a wider range of weather conditions, such as rain or fog, than optical imaging techniques. Radar and lidar are also able to operate over a longer range than optical imaging techniques.

A further advantage of radar and lidar is that radar and lidar provide much better distance perception than optical imaging, even compared with optical imaging using a stereo camera. This is because radar and lidar provide images of a scene which is an orthographic projection from above, most analogous to an infinitely high optical camera looking down on the scene, which makes it much easier to calculate positional relationships from the radar and lidar images. In contrast, an optical camera attached to a vessel is unable to provide the same angle of view, even if the optical camera is attached to a high point on the vessel as the camera is not sufficiently high above the vessel, which means that it is difficult to calculate positional relationships, particularly distance, from images from an optical camera.

The method may further comprise selecting the object. For example, the processor may select the object based on a user selection, for example, by a user tapping an image representing the object on a touch screen, or drawing a bounding box around an image of the object on a screen. Alternatively, the processor may select the object based on the fact that the object is the only object in the scene, or based on the fact that the object is the largest object in the scene or based on the fact that the object is scattering or reflecting the greatest amount of electromagnetic radiation, or based on the fact that the object has an intensity above a threshold.

The method may further comprise selecting a sub-region of one of the first and second images. The sub-region may be selected based on a user selection, or the processor may select the object based on a parameter, such as selecting a sub-region containing the only object in the scene, or selecting a sub-region containing the largest object in the scene, or selecting a sub-region containing the object scattering or reflecting the greatest amount of electromagnetic radiation, or selecting a sub-region containing the object which has an intensity above a threshold. Selecting a sub-region reduces computational resources, such as processor and memory requirements, which are necessary to perform the calculation of the positional relationship as the whole image need not be processed. Selecting a sub-region may also eliminate other objects from the sub-region which might otherwise interfere with the calculation of the positional relationship, or reduce the accuracy with which the positional relationship is calculated.

The sub-region may be selected so that the object fills a majority of the sub-region. Selecting a sub-region where the object fills the majority of the sub-region improves the accuracy of the calculation of positional relationship and prevents the device from erroneously calculating the positional relationship to a further object, rather than to the object.

The sub-region may be selected so that the sub-region contains no further object which moves relative to the object. Further objects which move relative to the object may reduce the accuracy of the calculation of separation distance and may cause the calculation of the separation distance to erroneously calculate the separation distance to the further object rather than calculating the separation distance to the object.

The sub-region may be selected by a processor, the selected sub-region may be displayed to a user, input from the user may be received, and the positional relationship may be calculated in response to receiving the input from the user. This is advantageous because the processor and the user can work together to ensure that a correct object and optimum sub-region are selected. For example, the processor may select a sub-region based on analysis of one or more images, so the processor may be able to select a sub-region based on information that is not immediately apparent to the user, which may lead to the processor picking a more optimum sub-region that the user would have picked. However, it is possible that the processor may sometimes pick an incorrect object to track, such as an object the user was not intending to track. By displaying to the user the sub-region containing the object the processor has selected and waiting for conformation from the user before proceeding with calculating the positional relationship, the selection by the processor can be confirmed. In this way, the processor and user can work together to optimise the selection of an optimum sub-region.

The method may further comprise comparing the first and second images in order to calculate one or more of a separation distance, a relative orientation and a bearing from the detector to the object based on the scattered radiation, and wherein the desired positional relationship is an equivalent one or more of a desired separation distance, desired relative orientation or desired bearing of the detector relative to the object. Preferably, the positional relationship and desired positional relationship is a separation distance.

The method may further comprise comparing the first and second images in order to calculate the relative orientation of the object and the detector. This allows the heading of the device to be matched to the heading of the object, or the heading of the device to be offset by a desired amount relative to the heading of the object.

The first and second images may be compared by scan-matching. Scan-matching is advantageous over other techniques for calculating the positional relationship, such as algorithms that only use lines and edges. This is because scan-matching, particularly dense scan-matching which compares the whole of the first and second images, makes optimal use of all of the information in the first and second images, which makes scan-matching robust and less prone to errors, and allows scan-matching to operate in complex scenes, for example scenes which do not have strong lines or edges such as outdoor scenes containing features like vegetation.

Scan-matching may comprise selecting a part of the second image based on a predicted change in the first image.

A prediction error relating to the separation distance, bearing or relative orientation may be calculated by optimising a function between the second image and the first image. The function may be a correlation between the second image and the first image.

The predicted location, or estimated change in positional relationship may be generated using an estimator such as a state observer, for example comprising one of a fixed gain state observer, a particle filter and a Kalman filter. The estimator may take a current speed of a vessel as a parameter, such as the current speed of a vessel on which a device performing the method is situated.

Creating first and second images may comprise calculating a spatial power spectral density of the intensity of the scattered radiation.

The scattered radiation may be from a frequency modulated continuous wave (FMCW) radar, and the first image and the second image may be radar images.

The method may further comprise using a dynamic positioning system to control a propulsion system to move a vessel, such as a vessel on which a device performing the method is situated, towards the target distance based on the error signal.

According to a third aspect of the invention, there is provided a targetless tracking device comprising a detector configured to receive scattered radiation indicative of the presence of an object. The device also comprises a processor configured to calculate a positional relationship between the device and the object based on the scattered radiation, receive an indication of a desired positional relationship of the detector relative to the object, and output an error signal indicative of the positional relationship versus the desired target distance so that the device position is able to be controlled to reduce the error signal. The processor is further configured to create first and second images at first and second points in time, respectively, and then compare the first and second images in order to calculate the positional relationship.

The fact that the processor is further configured to generate first and second images at first and second points in time, respectively, and then compare the first and second images in order to calculate the positional relationship, means that the device can determine the positional relationship between the device and an object without the need for a responder or target to be placed on the object.

In a particularly preferred embodiment, the first and second images are compared by scan-matching. Scan-matching is advantageous over other techniques for calculating the positional relationship, such as algorithms that only use lines and edges. This is because scan-matching, particularly dense scan-matching which compares the whole of the first and second images, makes optimal use of all of the information in the first and second images, which makes scan-matching robust and less prone to errors, and allows scan-matching to operate in complex scenes, for example scenes which do not have strong lines or edges such as outdoor scenes containing features like vegetation.

Scan-matching may comprise selecting part of the second image based on a predicted location of the object in the second image. Preferably, adjusting the second image to match the first image.

A prediction error relating to the positional relationship may be calculated by optimising a function between the second image and the first image. The function may be a correlation between the second image and the first image.

The predicted location, or estimated change in separation distance, bearing and/or relative orientation may be generated using an estimator such as a state observer which may comprise one of a fixed gain state observer, a particle filter and a Kalman filter. The estimator may take a current speed of the device as a parameter. The current speed of the device may be related to the current speed of a vessel to which the device is attached.

The source of the scattered radiation may be from a radar system in which the source may be an antenna, for example, a dipole, horn or parabolic dish reflector, or a phased array. The detector may be an antenna with the same or different properties as the source. The scattered radiation may be radiofrequency radiation: microwaves or radio waves. The scattered radiation may be from a frequency-modulated continuous-wave (FMCW) radar.

The source of the scattered radiation may be from a laser detection and ranging (LIDAR) system in which the source may be a laser. The detector may be a photodetector, such as a photomultiplier tube or an avalanche photodiode. The electromagnetic radiation may be visible light or infrared light.

An advantage of using radar is that radar operates better in a wider range of weather conditions, such as rain or fog, than optical imaging techniques. Radar and lidar are also able to operate over a longer range than optical imaging techniques.

A further advantage of radar and lidar is that radar and lidar provide much better distance perception than optical imaging, even compared with optical imaging using a stereo camera. This is because radar and lidar provide images of a scene which is an orthographic projection from above, most analogous to an infinitely high optical camera looking down on the scene, which makes it much easier to calculate positional relationships from the radar and lidar images. In contrast, an optical camera attached to a vessel is unable to provide the same angle of view, even if the optical camera is attached to a high point on the vessel as the camera is not sufficiently high above the vessel, which means that it is difficult to calculate positional relationships, particularly distance, from images from an optical camera.

The electromagnetic radiation is either: pulsed, or frequency-modulated continuous-wave, or chirped, being frequency modulated and pulsed. The fact that the electromagnetic radiation is pulsed or frequency-modulated continuous-wave, or chirped, allows for the range to an object to be determined.

The processor may be configured to select the object. For example, the processor may select the object based on a user selection, for example, by a user tapping an image representing the object on a touch screen, or drawing a bounding box around an image of the object on a screen. Alternatively, the processor may select the object based on the fact that the object is the only object in the scene, or based on the fact that the object is the largest object in the scene or based on the fact that the object is scattering or reflecting the greatest amount of electromagnetic radiation, or based on the fact that the object has an intensity above a threshold.

The processor may be configured to select a sub-region of one of the first and second images. The sub-region may be selected based on a user selection, or the processor may select the object based on a parameter, such as selecting a sub-region containing the only object in the scene, or selecting a sub-region containing the largest object in the scene, or selecting a sub-region containing the object scattering or reflecting the greatest amount of electromagnetic radiation, or selecting a sub-region containing the object which has an intensity above a threshold. Selecting a sub-region reduces computational resources, such as processor and memory requirements, which are necessary to perform the calculation of the positional relationship as the whole image need not be processed. Selecting a sub-region may also eliminate other objects from the sub-region which might otherwise interfere with the calculation of the positional relationship, or reduce the accuracy with which the positional relationship is calculated.

The sub-region may be selected so that the object fills a majority of the sub-region. Selecting a sub-region where the object fills the majority of the sub-region improves the accuracy of the calculation of separation distance and prevents the device from erroneously calculating the separation distance to a further object, rather than to the object.

The sub-region may be selected so that the sub-region contains no further object which moves relative to the object. Further objects which move relative to the object may reduce the accuracy of the calculation of separation distance and may cause the calculation of the separation distance to erroneously calculate the separation distance to the further object rather than calculating the separation distance to the object.

The processor may be configured to display the sub-region to a user, receive input from the user, and calculate the positional relationship in response to receiving the input from the user. This is advantageous because the processor and the user can work together to ensure that a correct object and optimum sub-region are selected. For example, the processor may select a sub-region based on analysis of one or more images, so the processor may be able to select a sub-region based on information that is not immediately apparent to the user, which may lead to the processor picking a more optimum sub-region that the user would have picked. However, it is possible that the processor may sometimes pick an incorrect object to track, such as an object the user was not intending to track. By displaying to the user the sub-region containing the object the processor has selected and waiting for conformation from the user before proceeding with calculating the positional relationship, the selection by the processor can be confirmed. In this way, the processor and user can work together to optimise the selection of an optimum sub-region.

The processor may be further configured to compare the first and second images in order to calculate one or more of a separation distance, a bearing or relative orientation between the device and the object based on the scattered radiation, and wherein the desired positional relationship is an equivalent one or more of a desired separation distance, desired relative orientation or desired bearing of the detector relative to the object. This allows the heading of the device to be matched to the heading of the object, or the heading of the device to be offset by a desired amount relative to the heading of the object. Preferably, the positional relationship and desired positional relationship is a separation distance.

Creating first and second images may comprise calculating a spatial power spectral density of the intensity of the scattered radiation.

The targetless tracking device may further comprise a dynamic positioning system configured to control a propulsion system to move a vessel towards the target distance based on the error signal.

The object may be a vessel, such as any kind of sea vessel, for example a ship, boat, tanker, ferry or hovercraft. Alternatively, the object may be a vehicle, such as a car, van, lorry, truck, bus, coach or motorcycle. Alternatively, the object may be a aircraft, or a submarine. Alternatively, the object may be an oil rig, buoy or other platform tethered at sea.

According to a fourth aspect of the invention, there is provided a device for targetless tracking, the device comprising a detector configured to receive scattered radiation indicative of the presence of an object. The device also comprises a processor configured to calculate a positional relationship between the device and the object based on the scattered radiation, receive an indication of a desired positional relationship of the detector relative to the object, and output an error signal indicative of the positional relationship versus the desired target distance so that the device position is able to be controlled to reduce the error signal. The processor is further configured to generate an image of the object based on the scattered radiation and select a sub-region of the image containing the object. The processor is configured to display the sub-region to a user, and receive input from the user. In response to receiving the input, the processor is configure to calculate the positional relationship by creating first and second images of the sub-region based on the scattered radiation at first and second points in time, respectively, and then comparing the first and second images in order to calculate the positional relationship.

The fact that the processor is further configured to generate first and second images at first and second points in time, respectively, and then compare the first and second images in order to calculate the positional relationship, means that the device can determine the positional relationship between the device and an object without the need for a responder or target to be placed on the object.

The fact that the processor is configured to display the sub-region to a user, receive input from the user, and calculate the positional relationship in response to receiving the input from the user is advantageous because the processor and the user can work together to ensure that a correct object and optimum sub-region are selected. For example, the processor may select a sub-region based on analysis of one or more images, so the processor may be able to select a sub-region based on information that is not immediately apparent to the user, which may lead to the processor picking a more optimum sub-region that the user would have picked. However, it is possible that the processor may sometimes pick an incorrect object to track, such as an object the user was not intending to track. By displaying to the user the sub-region containing the object the processor has selected and waiting for conformation from the user before proceeding with calculating the positional relationship, the selection by the processor can be confirmed. In this way, the processor and user can work together to optimise the selection of an optimum sub-region.

The processor may be configured to select the object. For example, the processor may select the object based on a user selection, for example, by a user tapping an image representing the object on a touch screen, or drawing a bounding box around an image of the object on a screen. Alternatively, the processor may select the object based on the fact that the object is the only object in the scene, or based on the fact that the object is the largest object in the scene or based on the fact that the object is scattering or reflecting the greatest amount of electromagnetic radiation, or based on the fact that the object has an intensity above a threshold.

The processor may be configured to select a sub-region of one of the first and second images. The sub-region may be selected based on a user selection, or the processor may select the object based on a parameter, such as selecting a sub-region containing the only object in the scene, or selecting a sub-region containing the largest object in the scene, or selecting a sub-region containing the object scattering or reflecting the greatest amount of electromagnetic radiation, or selecting a sub-region containing the object which has an intensity above a threshold. Selecting a sub-region reduces computational resources, such as processor and memory requirements, which are necessary to perform the calculation of the positional relationship as the whole image need not be processed. Selecting a sub-region may also eliminate other objects from the sub-region which might otherwise interfere with the calculation of the positional relationship, or reduce the accuracy with which the positional relationship is calculated.

The sub-region may be selected so that the object fills a majority of the sub-region. Selecting a sub-region where the object fills the majority of the sub-region improves the accuracy of the calculation of separation distance and prevents the device from erroneously calculating the separation distance to a further object, rather than to the object.

The sub-region may be selected so that the sub-region contains no further object which moves relative to the object. Further objects which move relative to the object may reduce the accuracy of the calculation of separation distance and may cause the calculation of the separation distance to erroneously calculate the separation distance to the further object rather than calculating the separation distance to the object.

The processor may select the sub-region based on identifying sets of connected pixels in the image which are at or above an intensity threshold. The sub-region may be selected based on the set of connected pixels having the highest overall intensity. The sub-region may be selected based on the smallest rectangle which fits around the set of connected pixels having the highest overall intensity.

The processor may be configured to expand the sub-region to allow for movement of the object. This ensures that when the object moves, the object is less likely to move outside the selected sub-region.

The source of the scattered radiation may be from a radar system in which the source may be an antenna, for example, a dipole, horn or parabolic dish reflector, or a phased array. The detector may be an antenna with the same or different properties as the source. The scattered radiation may be radiofrequency radiation: microwaves or radio waves. The scattered radiation may be from a frequency-modulated continuous-wave (FMCW) radar.

The source of the scattered radiation may be from a laser detection and ranging (LIDAR) system in which the source may be a laser. The detector may be a photodetector, such as a photomultiplier tube or an avalanche photodiode. The electromagnetic radiation may be visible light or infrared light.

An advantage of using radar is that radar operates better in a wider range of weather conditions, such as rain or fog, than optical imaging techniques. Radar and lidar are also able to operate over a longer range than optical imaging techniques.

A further advantage of radar and lidar is that radar and lidar provide much better distance perception than optical imaging, even compared with optical imaging using a stereo camera. This is because radar and lidar provide images of a scene which is an orthographic projection from above, most analogous to an infinitely high optical camera looking down on the scene, which makes it much easier to calculate positional relationships from the radar and lidar images. In contrast, an optical camera attached to a vessel is unable to provide the same angle of view, even if the optical camera is attached to a high point on the vessel as the camera is not sufficiently high above the vessel, which means that it is difficult to calculate positional relationships, particularly distance, from images from an optical camera.

The electromagnetic radiation is either: pulsed, or frequency-modulated continuous-wave, or chirped, being frequency modulated and pulsed. The fact that the electromagnetic radiation is pulsed or frequency-modulated continuous-wave, or chirped, allows for the range to an object to be determined.

The first and second images may be compared by scan-matching. Scan-matching is advantageous over other techniques for calculating the positional relationship, such as algorithms that only use lines and edges. This is because scan-matching, particularly dense scan-matching which compares the whole of the first and second images, makes optimal use of all of the information in the first and second images, which makes scan-matching robust and less prone to errors, and allows scan-matching to operate in complex scenes, for example scenes which do not have strong lines or edges such as outdoor scenes containing features like vegetation.

Scan-matching may comprise selecting part of the second image based on a predicted location of the object in the second image. Preferably, adjusting the second image to match the first image.

A prediction error relating to the positional relationship may be calculated by optimising a function between the second image and the first image. The function may be a correlation between the second image and the first image.

The predicted location, or estimated change in separation distance, bearing and/or relative orientation may be generated using an estimator such as a state observer which may comprise one of a fixed gain state observer, a particle filter and a Kalman filter. The estimator may take a current speed of the device as a parameter. The current speed of the device may be related to the current speed of a vessel to which the device is attached.

Creating first and second images may comprise calculating a spatial power spectral density of the intensity of the scattered radiation.

The processor may be further configured to compare the first and second images in order to calculate one or more of a separation distance, a bearing or relative orientation between the device and the object based on the scattered radiation, and wherein the desired positional relationship is an equivalent one or more of a desired separation distance, desired relative orientation or desired bearing of the detector relative to the object. This allows the heading of the device to be matched to the heading of the object, or the heading of the device to be offset by a desired amount relative to the heading of the object. Preferably, the positional relationship and desired positional relationship is a separation distance.

The device may further comprise a dynamic positioning system configured to control a propulsion system to move a vessel towards the target distance based on the error signal.

The object may be a vessel, such as any kind of sea vessel, for example a ship, boat, tanker, ferry or hovercraft. Alternatively, the object may be a vehicle, such as a car, van, lorry, truck, bus, coach or motorcycle. Alternatively, the object may be a aircraft, or a submarine. Alternatively, the object may be an oil rig, buoy or other platform tethered at sea.

According to a fifth aspect of the invention, there is provided a method for using a device according to any one of the first, third or fourth aspects.

According to a sixth aspect of the invention, there is provided a vessel or vehicle having a targetless tracking device according to any one of the first, third or fourth aspects. The vessel may be any kind of sea-going vessel, such as a ship, boat, tanker, ferry or hovercraft. The vehicle may be a car, van, lorry, truck, bus, coach or motorcycle.

BRIEF DESCRIPTION OF THE DRAWINGS

Embodiments of the invention shall now be described, by way of example only, with reference to the accompanying figures, in which.

DETAILED DESCRIPTION

Figure 1:
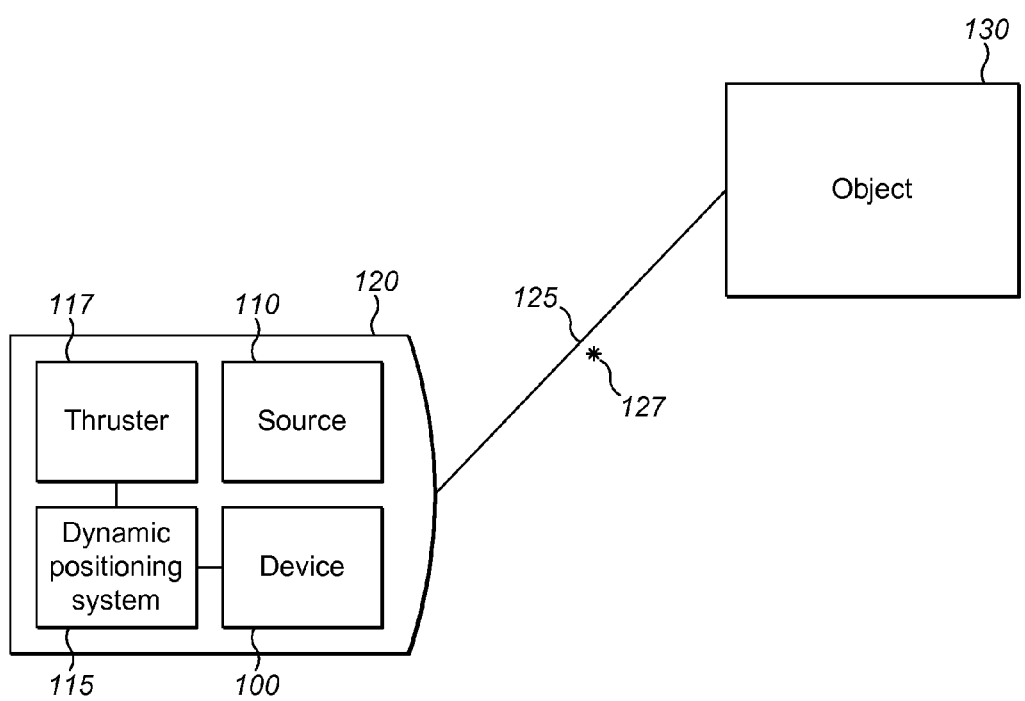
FIG. 1 is a schematic overview of a targetless tracking system.

FIG. 1 is a schematic overview of a targetless tracking system. The targetless tracking system uses a device 100 placed on a vessel 120 to move to, and maintain, a distance 125 between the vessel 120 and an object 130.

The object 130 is free to move relative to the vessel 120. The object 130 may be a further vessel, such as a ship, which is moving relative to the vessel 120 under its own power, or the further vessel may be anchored and moving relative to the vessel 120 in response to the waves and currents in the sea, or in response to the wind. The object 130 may also be a structure, such as an oil rig, which, although tethered to the seabed, is floating and therefore able to move in response to the waves and currents in the sea, or in response to the wind.

The vessel 120 needs to be able to move to, and maintain, a constant position and/or heading with respect to the object 130, against disturbances from wind, waves and current as well as the motion of the object 130.

The ability for the vessel 120 to be able to maintain a constant distance and/or heading relative to the object 130 is desirable in a number of applications. For example, if object 130 and the vessel 120 are part of a pipe-laying convoy, where the object 130 is a pipe-laying vessel and the vessel 120 is a supply ship carrying pipes, it is necessary for the supply ship carrying the pipes to maintain a constant position with respect to the pipe-laying vessel so that the pipe-laying vessel is able to collect pipes from the supply ship. Further examples of application which require a vessel 120 to be able to maintain a constant distance and/or heading relative to an object 130 include docking ships with oil rigs and undertaking replenishment at sea operations, amongst other applications.

Figure 2:
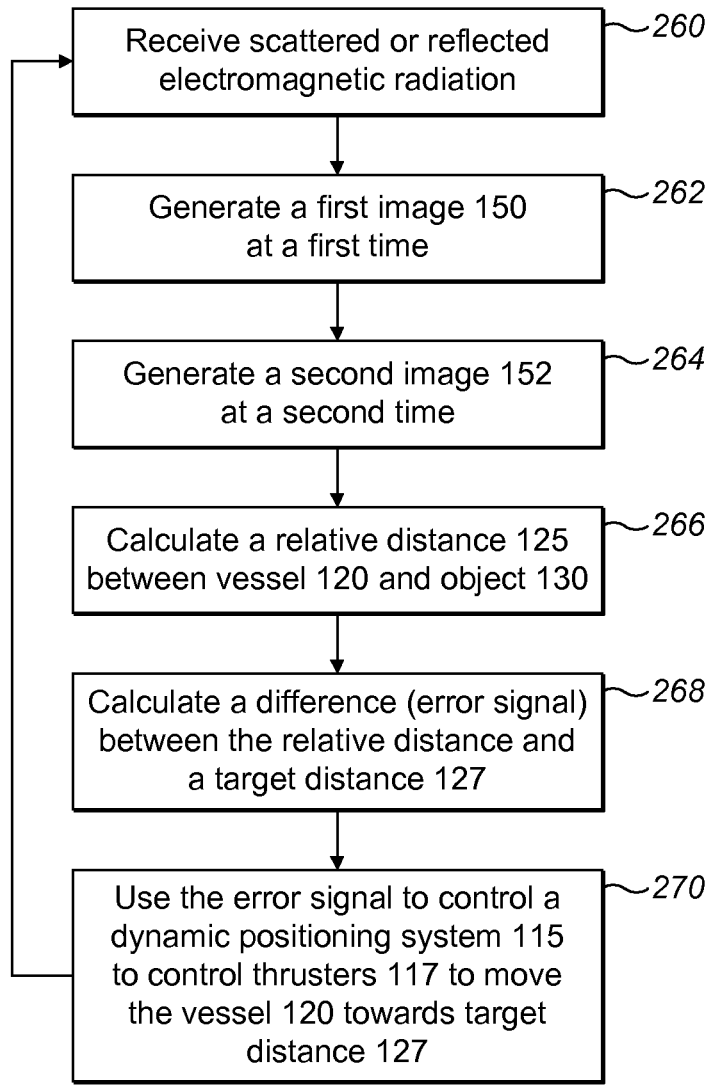
FIG. 2 is a flowchart illustrating a method of performing targetless tracking using the targetless tracking system of FIG. 1.

FIG. 2 shows a flowchart of steps 260-270 used to move the vessel 120 shown in FIG. 1 to a target distance relative to the object 130 or to maintain the vessel 120 at a target distance 127 relative to the object 130.

Figure 3:
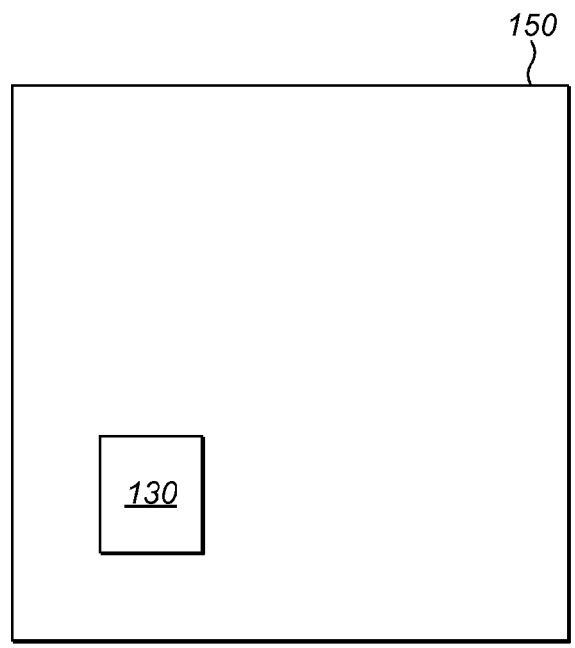
FIG. 3 shows a first image of the object shown in FIG. 1 at a first time.
Figure 4:
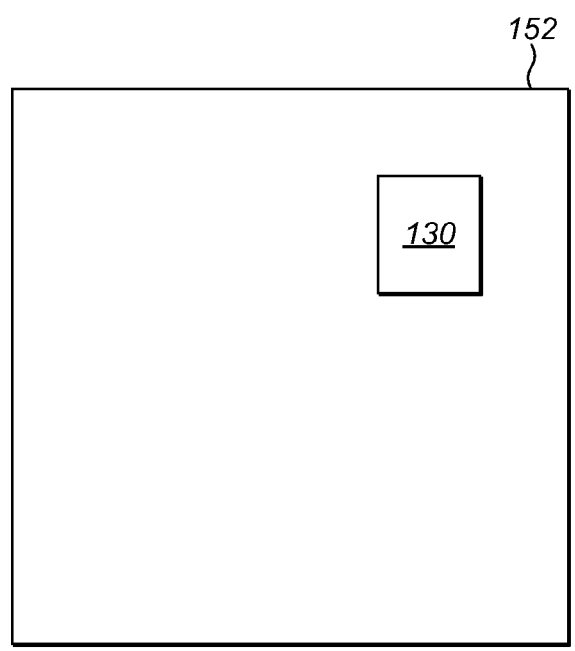
FIG. 4 shows a second image of the object shown in FIG. 1 at a second time.

Referring back to FIG. 1, the vessel 120 has a source 110 which illuminates the object 130 with electromagnetic radiation. Some of the electromagnetic radiation will be reflected from or scattered by the object 130, with some of the reflected or scattered radiation being intercepted by the device 100 (step 260). The device 100 can use the reflected or scattered radiation to create an image of the object 130, such as the images 150 and 152 shown in FIGS. 3 and 4.

The device 100 creates a first image 150 (shown in FIG. 3) of the object 130 at a first time (step 262). The device 100 then creates a second image 152 (shown in FIG. 4) of the object 130 at a second time (step 264). Between the time at which the first image 150 and the second image 152 were taken, either the vessel 120 or the object 130 may have moved, or both the vessel 120 and the object 130 may have moved. The first image 150 and the second image 152 show the relative movement that has taken place between the device 100 and the object 130 as a difference in the position of the object 130 between the first image 150 and the second image 152.

The device 100 uses this difference in position of the object 130 between the first image 150 and the second image 152 to calculate the relative distance 125 between the vessel 120 and the object 130 (step 266). The device 100 compares the relative distance 125 with a target distance 127 to determine an error between the relative distance 125 and the target distance 127 (step 268). The device 100 sends the error signal to a dynamic positioning system 115 which uses the error signal to control one or more thrusters 117 in order to move the vessel 120 towards the target distance 127 (step 270).

The device 100 repeats steps 260 to 270 in a loop to drive the vessel 120 towards the target distance 127, or to maintain the vessel 120 at the target distance 127 in the face of disturbance caused by wind, waves or current, or due to movement of the vessel 120 or the object 130.

Figure 5:
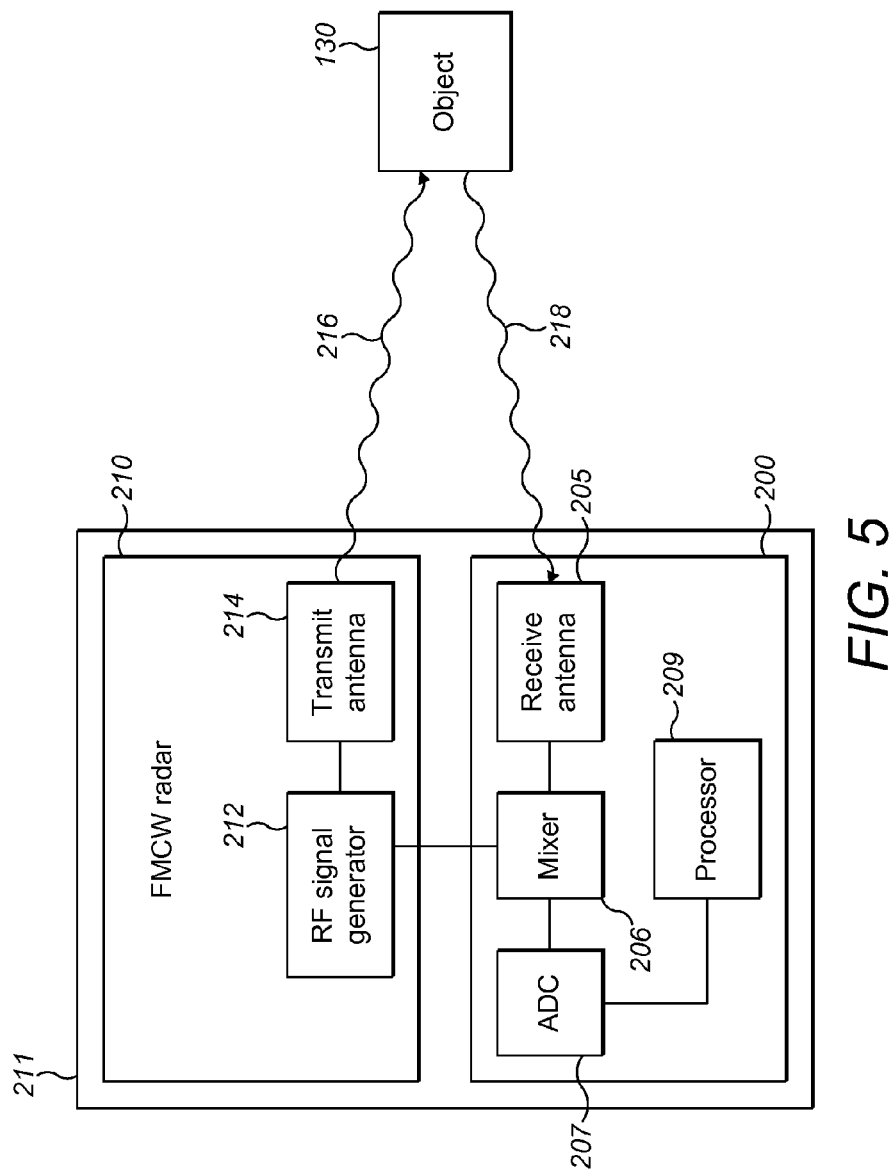
FIG. 5 shows an implementation of a targetless tracking system using a frequency-modulated continuous-wave (FMCW) radar.

An implementation of the device 100 using frequency-modulated continuous-wave (FMCW) radar is illustrated schematically in FIG. 5. The skilled person will be familiar with the principles of operation of an FMCW radar which are well documented, for example, in SKOLNIK; M. I., "*Introduction to Radar Systems*", McGraw-Hill Professional, $2^{nd}$ Edition (1 Dec. 1989).

The vessel 120 is equipped with a rotating FMCW radar 210 which emits a beam 216 comprising a modulated radio-frequency (RF) signal, that is, electromagnetic radiation having a frequency in the microwave or radiowave region. The modulated radio-frequency (RF) signal is generated by direct digital synthesis using an RF signal generator 212. The RF signal generator 212 generates a triangular linear frequency-modulation with a centre frequency of 9250 MHz, a frequency sweep of 100 MHz and a sweep time of 2 ms.

The modulated RF signal from the RF signal generator 212 is passed to a transmit antenna 214, such as a dipole, horn or parabolic dish reflector, or a patch array or phased array. The antenna 214 produces a linearly polarized beam which has an azimuthal beam width which is narrower than the elevation beam width. The azimuthal beam width is typically 3° and the elevation beam width is typically 12°.

The beam 216 is scattered or reflected from the object 130. The scattered or reflected signal 218 is gathered by a receive antenna 205.

The transmit antenna 214 and the receive antenna 205 are aligned so that they point in the same direction. The transmit antenna 214 and the receive antenna 205 are attached to a turntable 211. The turntable 211 spins around at a substantially constant angular speed. The current angle of the turntable 211 is measured, for example, using an optical encoder.

The sweep time of the frequency modulated beam 216 and angular speed of the turntable 211 are chosen so that the change in angle of the beam 216 from one sweep to the next sweep is less than the azimuth beam width. For the typical sweep time and azimuthal beam width described above, the angular speed for the turntable 211 is approximately 1 revolution per second.

The transmitted signal (that is, the signal from RF signal generator 212) and the received signal (that is, the signal from the receive antenna 205) are directed to mixer circuit 206. The mixer circuit 206 multiplies the transmitted signal with the received signal and applies a low-pass filter to the result. This produces a deramped signal. The frequency of the deramped signal is proportional to the distance to radar reflective or scattering surfaces, such as object 130, in the beam 216.

The deramped signal is fed to an analogue-to-digital converter (ADC) 207. The sampling rate of the ADC 207 determines the maximum range of the FMCW radar 210. For example, with the frequency sweep described above, if the ADC 207 has a sampling rate of 512 kHz, the FMCW radar 210 has a maximum range of 768 m.

The output of the ADC goes to a processor 209, such as an field programmable gate array (FPGA) or a digital signal processor (DSP) which processes each frequency sweep to generate a power spectral density for each frequency sweep, for example, by processing each frequency sweep with a fast Fourier transform.

Figure 6:
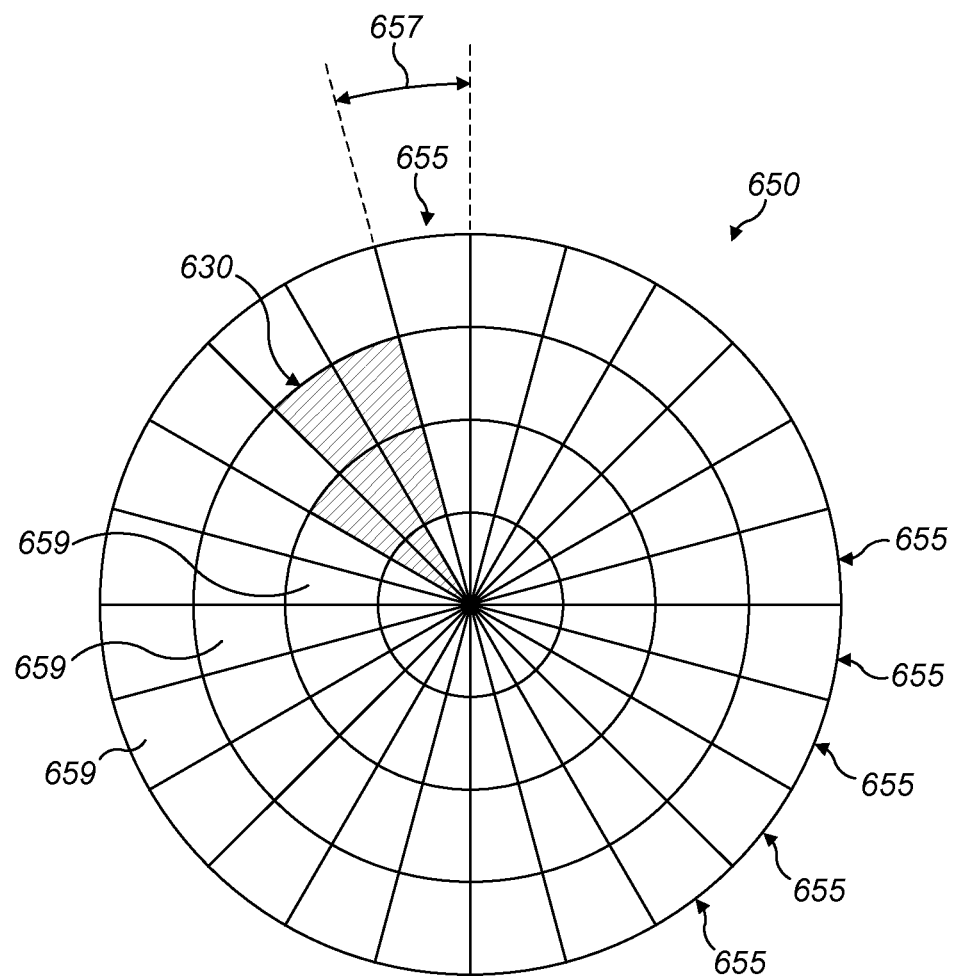
FIG. 6 shows a schematic radar image illustrative of a radar image that could be generated using the device of FIG. 5.

As shown in FIG. 6, by plotting the power spectral density of frequency sweeps 655 against the angle 657 of the turntable 211 during the respective frequency sweep 655, and repeating for all of the frequency sweeps 655 recorded during a revolution of the turntable 211, a polar image 650 of the scene in a 360 degree angle around the device 100 can be generated which shows the intensity 630 of scattered or reflected signal 218 reflected from the object 130 in each range-bearing cell 659 around the device 100.

The range resolution of the image 650 is equal to the range resolution of the FMCW radar 210 which can be calculated according to:

$$r_s = \frac{c}{2f_s},$$

where c is the speed of light and $f_s$ is the frequency of the frequency sweep 655. The angular resolution of the image 650 is equal to the angle 657 through which the turntable 211 turns during a single frequency sweep 655.

The power spectral density due to a point scatterer in the scene around the device 100 varies as a function of range (distance from the antenna) according to range$^{-4}$, and the volume of each range-bearing cell 659 varies in proportion to range$^2$. To correct for fall off in power as a function of range, the power spectral density is multiplied by range$^2$ to give an intensity for each range-bearing cell 659 which is proportional to the average radar reflectivity of the range-bearing cell 659.

At increasing range, the beam spread in elevation becomes wider than any object, such as the object 130, in the scene, which leads to a further reduction in intensity of the scattered or reflected signal 218 with range. If necessary, this further reduction in intensity can be corrected for by applying a further range dependent correction to the image 650.

Figure 7:
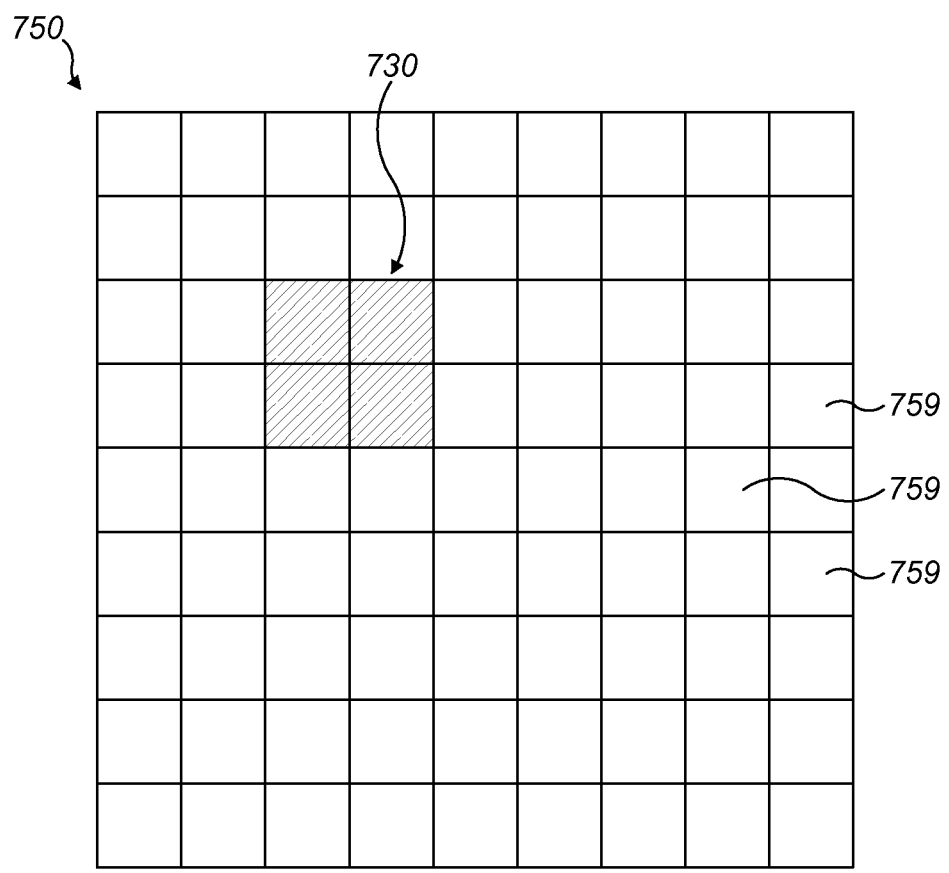
FIG. 7 shows the radar image of FIG. 6 converted into a Cartesian coordinate system.
Figure 8:
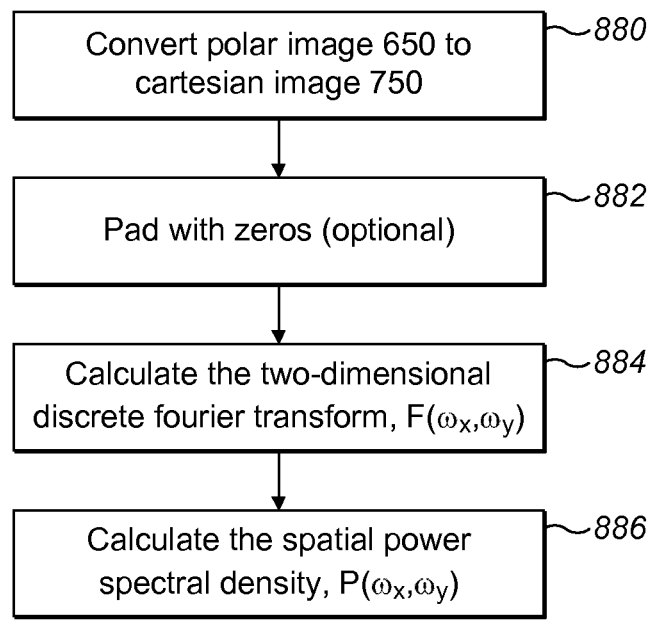
FIG. 8 is a flowchart illustrating a method for operating on the radar images shown in FIGS. 6 and 7.

Turning now to FIGS. 7 and 8, the polar image 650 (shown in FIG. 6) is converted to a Cartesian image 750 shown in FIG. 7 (at step 880 of FIG. 8). The Cartesian image 750 comprises a square or rectangular grid of pixels 759, and interpolation is carried out as necessary to compensate for the fact that the arrangement of range-bearing cells 659 in the polar image 650 is different from the arrangement of pixels 759 in the Cartesian image 750, to arrive at an image of the object 730 in a Cartesian coordinate system.

The polar image 650 may be circular and may also not have equal horizontal and vertical dimensions and, since it is more convenient to operate on a square image, the Cartesian image 750 may be padded with zeros along the top or bottom edges or along the left or right sides to make the Cartesian image 750 square (step 882).

A two-dimensional discrete Fourier transform $F(\omega_x, \omega_y)$ of the Cartesian image 750 is calculated (at step 884) according to:

$$F(\omega_x, \omega_y) = \sum_x \sum_y I(x, y) e^{(-j(\omega_x x + \omega_y y))},$$

where: $(\omega_x, \omega_y)$ is the angular spatial frequency in radians/metre of a pixel 759 at coordinates (x, y) where $\omega_x$ and $\omega_y$ are in the range of $-\pi/l$ to $+\pi/l$ in steps of $2\pi/d$; l is the length of the Cartesian image 750; d is the pixel separation in the Cartesian image 750; $\omega_x x + \omega_y y$ is the product of the angular spatial frequency and the position; I(x, y) is the intensity at a pixel with co-ordinates (x, y).

From this we can calculate a spatial power spectral density $P(\omega_x, \omega_y)$ at step 886:

$$P(\omega_x, \omega_y) = F(\omega_x, \omega_y) F^*(\omega_x, \omega_y).$$

Figure 9:
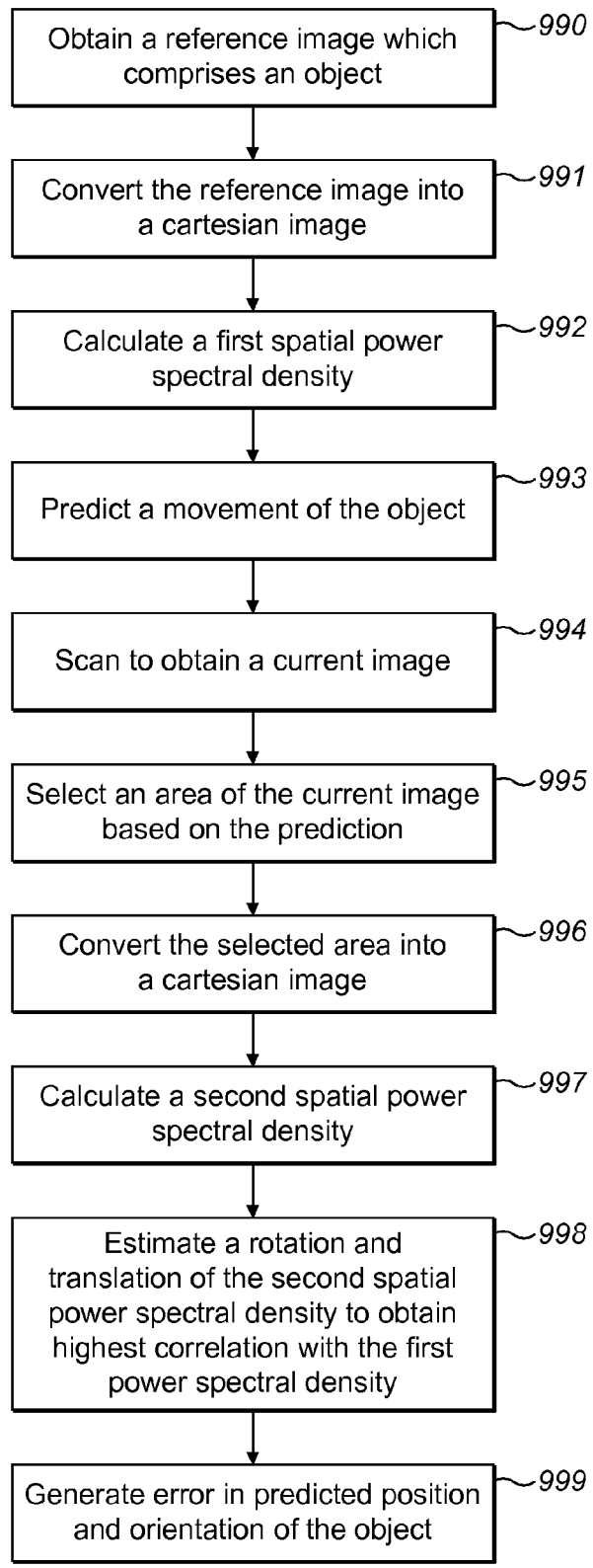
FIG. 9 is a flowchart illustrating a method for scan-matching.
Figure 10:
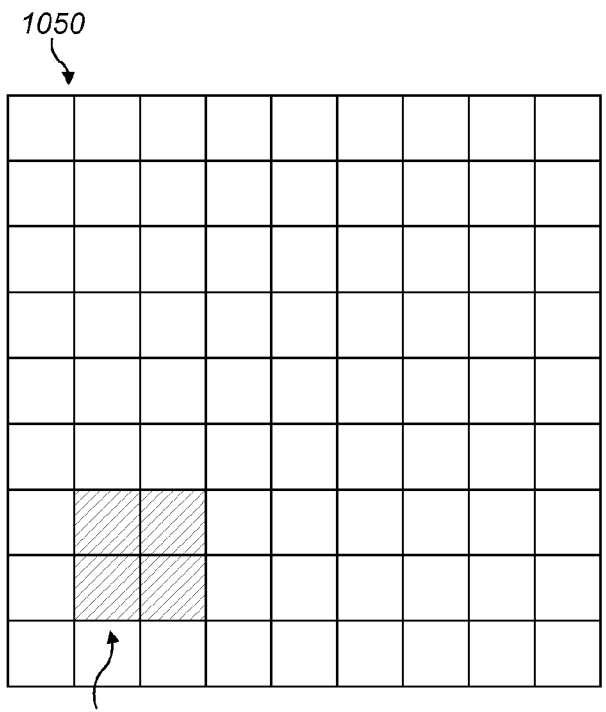
FIG. 10 illustrates a radar image of the object shown in FIG. 1 at a first time following conversion of the radar image into a Cartesian coordinate system.

A process of scan-matching, as illustrated in FIG. 9, is used to determine the movement of the object 130. The process of scan-matching proceeds as follows. A first image, or reference image, 1050 (shown in FIG. 10) is produced by the device 200 of the intensity of some or all of the scattered or reflected radar signal 1030, including that from the object 130 during a first, or reference scan. A first spatial power spectral density of the first image 1050 is calculated (at step 992).

Figure 11:
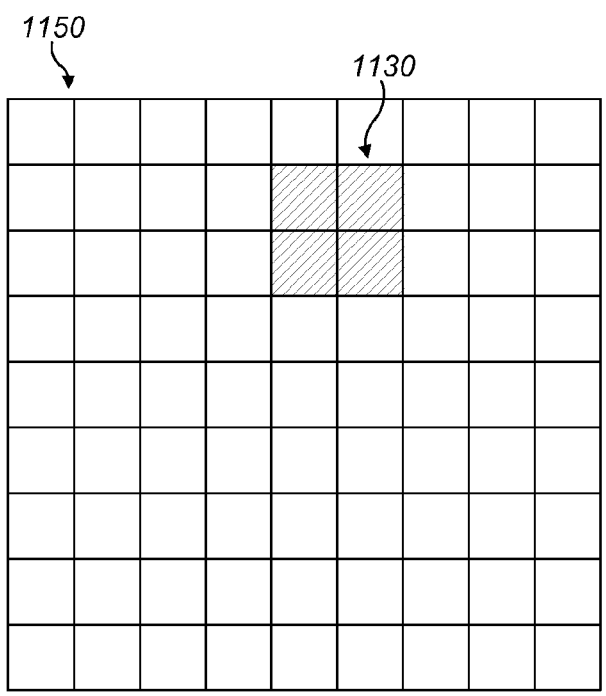
FIG. 11 illustrates a radar image of the object of FIG. 1 at a second time following conversion of the radar image into a Cartesian coordinate system.

At some time later, for example, on the next rotation of the turntable 211, a current scan is produced by the device 200 yielding a second image, or current image, 1150 (shown in FIG. 11). The current image is some or all of the intensity of the scattered or reflected radar signal 1130, including that from the object 130.

After the first image, or reference image, is produced an estimator predicts the position and orientation of the image of the object in the current scan. Based on this prediction, a selection of an area of the current image is made corresponding to the object 130. A second spatial power spectral density of the second image 1150 is calculated (at step 995) based on the selection. The second spatial power spectral density from the current scan is compared to the first spatial power spectral density from the reference scan to find the error in the prediction. This is often termed the innovation (the unexpected part of the change) in the position-heading of the object 130 relative to the sensor 200. The first spatial power spectral density is then compared with the second spatial power spectral density to determine whether the estimate was an accurate reflection of the rotation of the object 130 between the first image 1050 and the second image 1150 by calculating a correlation $\rho(\theta)$ for the estimated angle $\theta$ according to:

$$\rho(\theta) = \sum_{\omega_x} \sum_{\omega_y} P_1(\omega_x, \omega_y) P_2(\omega_x \cos\theta + \omega_y \sin\theta, -\omega_x \sin\theta + \omega_y \cos\theta),$$

where $P_2$ is the second spatial power spectral density and $P_1$ is the first spatial power spectral density.

Further estimates for $\theta$ are made to find the value of $\theta$ that leads to the largest value of $\rho(\theta)$, which corresponds to the best estimate of the rotation angle.

To improve the accuracy of the calculation of the rotation angle, values either side of the estimated angle that gave the largest value of $\rho(\theta)$ may be chosen and a quadratic equation may be fitted to the values to determine a value of $\theta$ which maximises the quadratic equation. The value of $\rho(\theta)$ is calculated for this new value of $\theta$. This fitting process can be continued iteratively until a sufficiently accurate value of $\theta$ is found.

To calculate the translation of the object 130 between the first image 1030 and the second 1130, the following steps are taken. The optimum estimated angle, that is, the estimated angle that gave the largest value of $\rho(\theta)$ is applied to the Fourier transform of the second Cartesian image $F_2$, as follows:

$$F_{R2}(\omega_x, \omega_y) = F_2(\cos\theta \cdot \omega_x + \sin\theta \cdot \omega_y, -\sin\theta \cdot \omega_x + \cos\theta \cdot \omega_y),$$

where $\theta$ is the optimum estimated angle.

Next, the normalised cross-spectrum F is calculated according to:

$$\Gamma(\omega_x, \omega_y) = \frac{F_{R2}(\omega_x, \omega_y) F_1^*(\omega_x, \omega_y)}{\sqrt{P_{R2}(\omega_x, \omega_y) P_1(\omega_x, \omega_y)}}.$$

Where $P_{R2} = F_{R2} \cdot F_{R2}^*$.

An inverse Fourier transform of F is taken in order to obtain the correlation $\rho(x,y)$ as a function of the translation from image 1050 to image 1150. The values of x and y are found which maximise $\rho(x,y)$, where the values of x and y are the horizontal and vertical shifts of object 130 between image 1050 and image 1150.

To improve the accuracy of the calculation of x and y, values neighbouring x and y are calculated and a quadratic surface fitted. The values of x and y which maximise this quadratic surface are found. This fitting process can be continued iteratively to find sufficiently accurate values of x and y.

Very often, particularly in a marine environment, there is nothing in the scene around the device 200 which is in the range of the FMCW radar 210 and which gives a significant scattered or reflected signal 218 apart from the object 130. In that case, calculations of the translation and rotation of the object 130 between the first image 1050 and the second image 1150 can be performed based on the whole of the first image 1050 and the whole of the second image 1150, as described above.

Figure 12:
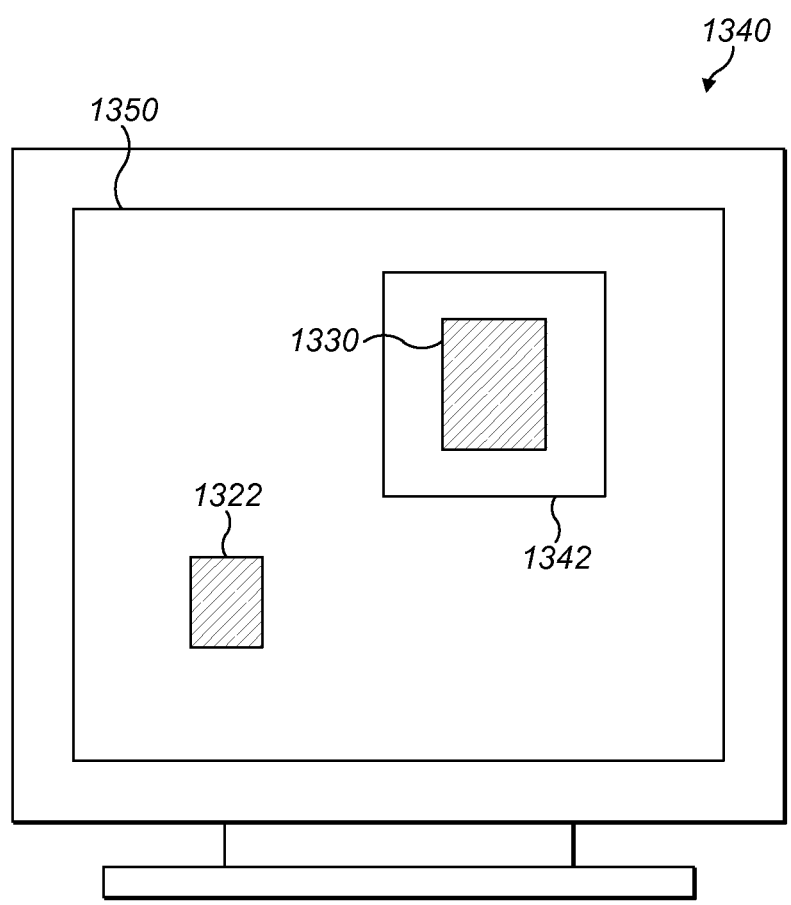
FIG. 12 illustrates the selection of a sub-region from an image.

However, processing empty regions of the first image 1050 and the second image 1150 imposes an unnecessary computational burden on the processor 209, so an alternative strategy is to select a sub-region of images 1050 and 1150, such as the sub-region 1342 shown in FIG. 12. Selecting a sub-region 1342 has the benefit of reducing the computational burden on the processor 209 by reducing the amount of data that must be processed. Selecting a sub-region 1342 also has the benefit of improving the accuracy of the calculation of the change in angle and translation of the object 130 when further objects are present in the scene, such as the object 1332 shown in FIG. 12.

The sub-region 1342 may be selected in a number of ways. For example, the image 1350 may be displayed to a user on a screen 1340 and the user may select the sub-region 1342 of the image 1350 which corresponds to the object 130. One way for the user to select the sub-region 1342 is for the user to specify a sub-region 1342 which encloses the image 1330 of the object 130, for example, by drawing a bounding box on the screen 1340. The sub-region 1342 should be as small as possible provided that it entirely encloses the image 1330. The orientation of the sub-region 1342 may be chosen such that the sides of the sub-region 1342 are parallel and perpendicular to the ray from the sensor to the centre of the sub-region 1342. Here, the ray is the path taken by the radiation. In this case it is a straight line from the sensor to the middle of the sub-region.

For best results intensity around the boundary of the sub-region 1342 should be low.

If there is a further object in the image 1350 which lies across the boundary of the sub-region 1342, this may reduce the accuracy of position tracking, because it may lead to "tiling" error. If part of the image that we are matching lies across the boundary of the region included in the correlation calculation, the match will be attracted to the solution which keeps the same section of the object in the selected region rather than the match which lines up the details across the whole image as closely as possible. A further object which overlaps the boundary of the sub-region 1342 may be handled by blanking out the portion of the sub-region 1342 where the further object overlaps the boundary of the sub-region 1342.

If there is a further object which is very close to (that is, touching or nearly touching) the object 130 and that is moving relative to the vessel 120, it may be necessary to track the further object so that the further object can be blanked out accurately.

The selection of the sub-region 1342 can be partially or fully automated. For example, the image 1350 can be processed, by the processor 209, to identify sets of connected pixels in the image 1350 which are at or above an intensity threshold. The processor 209 can then select the set of connected pixels which has the largest combined intensity and the processor 209 can find the smallest rectangle which fits around the set of connected pixels. The results of this calculation can be displayed to the user as a suggested sub-region 1342, with further calculations undertaken only once the user has confirmed the selection of the sub-region 1342.

The processor 209 and the user can work together to ensure that a correct object 130 and optimum sub-region 1342 are selected. The sub-region 1342 can be selected by the processor 209, for example, by the processor 209 analysing the image 1350 to determine a portion of the image 1350 containing an object 130. The processor 209 may be able to select a sub-region based on information that is not immediately apparent to the user, which may lead to the processor 209 picking a more optimum sub-region 1342 than the user would have picked However, it is possible that the processor 209 may sometimes pick an incorrect object 130 to track, such as an object 130 the user was not intending to track. So, the sub-region 1342 is displayed to a user as a suggested sub-region 1342, and the processor 209 waits for input from the user indicating that the sub-region 1342 is suitable, for example, that the sub-region 1342 includes the correct object that the user intends to track.

If the user is satisfied that the sub-region 1342 is suitable, the user indicates that they have accepted the sub-region 1342, such as by clicking the sub-region 1342 on a user-interface or pressing a "select" button. Once the user has indicated that they have accepted the sub-region 1342, the processor 209 proceeds with calculating the positional relationship. By displaying to the user the sub-region containing the object the processor has selected and waiting for conformation from the user before proceeding with calculating the positional relationship, the selection by the processor can be confirmed. In this way, the processor and user can work together to optimise the selection of an optimum sub-region.

Having selected a sub-region 1342, the sub-region 1342 may be expanded by the processor 209 to allow for movement of the object 130 between images.

The scan-matching described in the example given above is sometimes referred to as dense scan-matching because the entire reference image is compared with the entire second image, or the entire sub-region of the reference image is compared with the entire sub-region of the second image.

Movement of the device 200 relative to the object 130 during a frequency sweep 655 leads to error in range measurements caused by the Doppler effect. During the up-sweep of a frequency sweep 655, an object 130 which is approaching the device 200 will appear to be closer to the device 200 than the true range of the object 130. In contrast, an object 130 which is moving away from the device 200 will appear to be further away from the device 200 than the true range of the object 130.

During the down-sweep of a frequency sweep, the opposite occurs, so an object 130 which is approaching the device 200 will appear to be further away from the device 200 than the true range of the object 130 whereas an object 130 which is moving away from the device 200 will appear to be closer to the device 200 than the true range of the object 130.

It may, therefore, be desirable to apply a Doppler correction to range measurements. If a velocity estimate of the object 130 relative to the device 200 is known, this can be used to apply a Doppler correction. In the absence of a velocity estimate, separate up-sweep and down-sweep images can be obtained to determine a velocity estimate and correct the image for Doppler error. Two approaches are available:

In the first approach we calculate a Doppler shift which maximises the correlation between the up-sweep image and the down-sweep image. This gives us a radial speed estimate from a single sweep.

In the second approach we compare the up-sweep image from the first scan with the up-sweep image from the second scan and also compare the down-sweep image from the first scan with the down-sweep image from the second scan. This gives us two different estimates of the relative position during the two scans. We can then average them out to get an estimate of the relative velocity.

A velocity estimate of the object 130 relative to the device 200 can also be obtained using a Kalman filter to track the position and velocity of the object 130 relative to the device 200. Other techniques for tracking the position and velocity of the object 130 relative to the device 200 could be used, for example, a particle filter or a linear state observer.

A Kalman filter using the coloured noise model of speed could be used to track the position and velocity of the object 130 relative to the device 200 as follows.

The state vector of the Kalman filter contains the elements in Table 1.

TABLE 1

$$x = \begin{bmatrix} R \\ \varphi \\ \theta \\ \dot{r} \\ \dot{\varphi} \\ \dot{\theta} \end{bmatrix}$$

Kalman filter state vector

| | |
|---|---|
| R | Distance from the device 200 to the object 130 |
| φ | Bearing to the object 130 |
| θ | Orientation of the object 130 |
| ṙ | Rate of change of distance R |
| φ̇ | Rate of change of bearing φ |
| θ̇ | Rate of change of orientation θ |

Initially, the rates of change $\dot{r}$, $\dot{\varphi}$ and $\dot{\theta}$ are set to zero. The state covariance takes an initial value of:

$$P = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & \sigma_{v0}^2 & 0 & 0 \\ 0 & 0 & 0 & 0 & \frac{\sigma_{v0}^2}{R^2} + \sigma_{\omega 02}^2 & 0 \\ 0 & 0 & 0 & 0 & 0 & \sigma_{\omega 01}^2 + \sigma_{\omega 02}^2 \end{bmatrix},$$

where the variance of the position elements of the object 130 relative to the vessel 120 is zero because position is defined relative to the first image 1050, $\sigma_{v0}$ is the maximum likely speed of the object 130 relative to the vessel 120; $\omega 01$ is the maximum likely angular speed of the object 130; and $\sigma_{\omega 02}$ is the maximum likely angular speed of the vessel 120.

Given the time elapsed τ between the first image 1050 and the second image 1150, the Kalman state vector $$\underline{x}(t_{i+1}|t_i) = A\underline{x}(t_i|t_i)$$

and covariance $$P(t_{i+1}|t_i) = APA^T + Q,$$

can be extrapolated, where A is the state transition matrix given by:

$$A = \begin{bmatrix} 1 & 0 & 0 & \tau & 0 & 0 \\ 0 & 1 & 0 & 0 & \tau & 0 \\ 0 & 0 & 1 & 0 & 0 & \tau \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

and Q is the state noise covariance given by:

$$Q = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & \sigma_v^2 & 0 & 0 \\ 0 & 0 & 0 & 0 & \frac{\sigma_v^2}{R^2} + \sigma_{\omega 2}^2 & 0 \\ 0 & 0 & 0 & 0 & 0 & \sigma_{\omega 1}^2 + \sigma_{\omega 2}^2 \end{bmatrix},$$

where $\sigma_v$ is the likely change in speed of the object 130 relative to the vessel 120; $\sigma_{\omega 1}$ is the likely change in angular speed of the object 130; and $\sigma_{\omega 2}$ is the likely change in angular speed of the vessel 120.

Instead of using the coloured noise model described above, other models of speed could be used. Additionally, measurements of the speed of the vessel 120 or measurements from the thrusters 117 of the vessel 120 could be used to predict the speed of the object 130 relative to the vessel 120, which is beneficial if the object 10 is moving relatively slowly.

The scan-matching algorithm, illustrated in FIG. 9, calculates the innovation in rotation and translation of the object 130 relative to the prediction. In other words the error in the predicted position and orientation $\Delta R$, $\Delta \phi$ and $\Delta \theta$ may be calculated.

The state of the Kalman filter contains the polar co-ordinates of the object in the vessel frame, R, $\phi$, and the orientation of the object relative to the vessel, $\theta$.

The scan-match process measures the unexpected portion of the motion of the vessel with respect to the object 130, i.e. the innovation. This is represented as a translation in Cartesian co-ordinates, $\Delta x$, $\Delta y$, and rotation in the image frame, $\Delta \theta$.

The innovation translation can be converted from Cartesian co-ordinates in the image frame into polar-coordinates in the vessel frame according to:

$$\begin{bmatrix} \Delta x_v \\ \Delta y_v \end{bmatrix} = \begin{bmatrix} \cos(\theta + \Delta \theta) & -\sin(\theta + \Delta \theta) \\ \sin(\theta + \Delta \theta) & \cos(\theta + \Delta \theta) \end{bmatrix} \begin{bmatrix} \Delta x \\ \Delta y \end{bmatrix}$$

$$\Delta R = \sqrt{(R + \Delta x_v)^2 + \Delta y_v^2} - R$$

$$\Delta \varphi = \arctan 2(\Delta y_v, R + \Delta x_v)$$

From these errors:

$$\underline{x}(t_i | t_i) = \underline{x}(t_i | t_{i-1}) + K \begin{bmatrix} \Delta R \\ \Delta \phi \\ \Delta \theta \end{bmatrix}$$

$$P(t_i | t_i) = (I - KH) \cdot P(t_i | t_i)$$

$$K = PH^T (HPH^T + R)^{-1}$$

$$H = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}$$

where R is the measurement noise covariance. R represents the performance of the scan-matching algorithm which depends both on the properties of the FMCW radar 210 and the radar scattering and reflection properties of the object 130. A detailed model of R can be built over a number of measurements compared to ground truth in authentic operating conditions. When assessing the performance of a measurement system, the "ground truth" is an alternative means of position measurement which is much more accurate than the system under test. It may come from a much more expensive measurement device or from a measurement technique which requires manual intervention.

The first image 1050 will be saved as a reference image and further images of the scene are captured as the radar 210 repeatedly scans the scene, with the translation and change in angle of the object 130 being determined relative to the reference image. For as long as the distance (that is, R) and aspect (that is, $\theta - \phi$) of the object 130 does not change significantly relative to the vessel 120, comparing future images to the first image 1050 as reference image gives reasonable results. Once the change in R, $\theta$ or $\phi$ exceeds a threshold, a new image is adopted as the reference image, for example, by making a current or recent image a reference image.

The threshold is based on the variability in appearance of the object 130 between images as the vessel 120 changes distance and aspect with respect to the object 130, for example, as the vessel 120 gets closer to the object 130, the object will appear larger, and if the vessel 120 makes a significant orientational change with respect to the object 130, the shape of the object 130 may appear significantly different if the object is not rotationally symmetrical.

It is undesirable to update the reference image every time a new image is created, because constantly updating the reference image causes a loss of information about the motion of the vessel through the chain of reverence scans. Yet it is ineffective to compare an image with a reference image when the object 130 looks quite different in the image than the reference image because this leads to a poor correlation between the image and the reference image.

An optimum scheme for updating the reference image is obtained after some experience of the operating conditions are gained and will differ according to the type of object 130 being tracked. However, a starting threshold of around a 25% change in range or a 30° change in orientation is typically found to lead to acceptable results.

The state of the Kalman filter is retained at the time that the new reference image is adopted, along with the covariance as a measure of the position of the new reference image relative to the previous reference image. Only the position states and the upper left of the covariance matrix are preserved. No speed information is retained.

The covariance of the Kalman filter is then adjusted to discard any information about the correlation between the estimate of the current speed and the estimate of the position relative to the old reference image. Going forwards, the Kalman filter will track the current position of the object 130 relative to the new reference image, so the position terms in the state covariance matrix are reset to zero. Updating the Kalman filter in light of the new reference image is achieved as follows:

$$P(+) = \begin{bmatrix} 0_{33} \\ I_{33} \end{bmatrix} \left( \begin{bmatrix} 0_{33} & I_{33} \end{bmatrix} P(-)^{-1} \begin{bmatrix} 0_{33} \\ I_{33} \end{bmatrix} \right)^{-1} \begin{bmatrix} 0_{33} & I_{33} \end{bmatrix},$$

-continued where $$O_{33} = \begin{bmatrix} 0 & 0 & 0 \\ 0 & 0 & 0 \\ 0 & 0 & 0 \end{bmatrix},$$

and $$I_{33} = \begin{bmatrix} 1 & 0 & 0 \\ 0 & 1 & 0 \\ 0 & 0 & 1 \end{bmatrix}.$$

If necessary, a new sub-region may be defined centred on the image of the object 130 in the new reference image, allowing sufficient room around the image of the object 130 for the object 130 to move.

Instead of picking a current reference point, if the distance and orientation of the object 130 relative to the vessel 120 becomes closer to that seen for a historical reference image, the historical reference image can be selected as the new reference image.

The set of historical reference images may be stored. The set of historical reference images act as a map, connecting information gathered about the relative position and orientation of the object 130 relative to the vessel 120 viewed from different ranges and aspects though a sequence of viewpoints taken from the vessel 120. An estimate of the location of each historical reference images relative to one another is also stored. Returning to a historical reference image creates a loop. The positions within this loop are now over-constrained. The observations can be reconciled by attributing the errors across the whole set of reference points. This process is called "bundle adjustment". This is a familiar problem for anyone skilled in the art of surveying. Say I tell you that town B is 5.0 miles north of town A. And that town C is 8.0 miles west of town B and that town D is 7.0 miles south west of town C. Finally I tell you that town A is 3.0 miles west of town D. You've now got a loop where the measurements are not quite consistent with each other. So if you want, you can calculate co-ordinates of B, C and D relative to A which are a best fit to the measurements I've given you. This is the bundle adjustment. The output is a correction to the position-heading of each reference point relative to the first estimate of the position-heading of that reference point.

The dynamic positioning system 115 contains a target distance and aspect for the vessel 120 relative to the object 130. Following bundle adjustment, the nearest historical reference image to the target can be found and the same correction applied to the coordinates of the target distance and orientation position as was applied to the nearest reference point.

If the vessel moves through a long loop in the distance-aspect space (in the linear algebra sense of a 2D vector space with dimensions of distance and of aspect), large errors can accumulate in the estimated distance to a historical reference image. In many applications for this invention, the displacement and rotation measurements based on one reference image or another reference image are relatively accurate, and loops are fairly short. In that case a naïve match to an old reference image gives adequate results, otherwise, it may be necessary to search through the set of historical reference images to find a historical reference image which is close to the current position in distance-aspect space. A "naive" match is meant in the sense that we look simply for the nearest historical reference scan to our current estimated position. Since our current position estimate contains an accumulation of errors, this naive match may not find the reference scan which is closest to our current actual position.

Referring back to FIG. 1, which shows the device 100 attached to a vessel 120, the separation distance error ΔR, bearing error Δφ and orientation error Δθ can now be fed into the dynamic positioning system 115 which can in turn control the thrusters 117 to control the movement of the vessel 120 and move the vessel 120 towards the target distance 127.

Optionally, the relative heading of the vessel 120 relative to the object 130 can also be controlled, but since the vessel 120 also has a compass (as may the object 130), heading control is not always necessary because, for example, the vessel 120 and the object 130 can move on an pre-agreed heading. Also, when the object 130 and the vessel 120 are far apart, the image of the object 130 provides insufficient information for a good estimate of the relative orientation of the object 130 relative to the vessel 120, so only position is controlled and the heading of the vessel 120 is set to minimise the drag on the vessel 120.

A thruster 117 comprises a variable speed fixed pitch propeller which is driven by an induction motor from a variable frequency converter. The thruster further comprises an azimuthing motor which can rotate the propeller and propeller motor with respect to the vessel 120. The thruster 117, or the dynamic positioning system used to control the thruster 117, is supplied with a direction reference and a speed reference. The thruster 117, or the dynamic positioning system used to control the thruster, uses feedback control to rotate the thruster propeller to the desired direction with respect to the vessel 120. Feedback control is also used to bring the propeller speed in line with the speed reference.

So far, the position and aspect of the object 130 have been calculated in a coordinate system of the vessel 120. The coordinates of the vessel 120 in a coordinate system of the rig 130 can be calculated according to:

$$x = -R \cos(\theta - \phi)$$

$$y = R \sin(\theta - \phi)$$

$$\psi = -\theta$$

where x and y are the Cartesian coordinates of the vessel in the object frame, and ψ is the orientation of the vessel in the object frame. The object frame is centred on the middle of the object, i.e. the centre of the first image of the object.

Assuming, for convenience, that the receive antenna 205 is at the centre of the vessel 120 and that the orientation of the receive antenna 205 is aligned with the orientation of the vessel 120, otherwise, a correction for the position of the receive antenna 205 with respect to the centre of the vessel 120 may be applied.

The equation of motion governing the vessel 120 is given by:

$$M\underline{\ddot{x}} = R(\psi)(\underline{t} - D\underline{v})$$

where $\underline{x}$ is the position-heading vector of the vessel 120 given by $$\underline{x} = \begin{bmatrix} x \\ y \\ \psi \end{bmatrix},$$

v is the velocity of the vessel 120 with respect to the water given by $$\underline{v} = \begin{bmatrix} u \\ v \\ \omega \end{bmatrix},$$

$\underline{t}$ is the thrust of the thruster 117 given by $$\underline{t} = \begin{bmatrix} t_u \\ t_v \\ t_\omega \end{bmatrix},$$

M is the inertia given by $$M = \begin{bmatrix} m & 0 & 0 \\ 0 & m & 0 \\ 0 & 0 & J \end{bmatrix},$$

$R(\psi)$ is a rotation matrix given by $$R(\psi) = \begin{bmatrix} \cos\psi & -\sin\psi & 0 \\ \sin\psi & \cos\psi & 0 \\ 0 & 0 & 1 \end{bmatrix},$$

and D is the drag given by $$D = \begin{bmatrix} d_u & 0 & 0 \\ 0 & d_v & 0 \\ 0 & 0 & d_\omega \end{bmatrix},$$

and where, u is for forward speed of the vessel 120 relative to the water; v is the lateral speed of the vessel 120 relative to the water (port is positive); ω is the angular speed of the vessel 120 relative to the water; $t_u$ is the forward thrust of the vessel 120; $t_v$ is the lateral thrust of the vessel 120; $t_\omega$ is the turning moment on the vessel 120 from the thrusters; m is the mass of the vessel 120; J is the moment of inertia of the vessel 120; and $d_u$, $d_v$ and $d_\omega$ are the drag coefficients of the vessel 120. The velocity u and v of the vessel 120 with respect to the water can be measured using acoustic Doppler log devices (1302).

Figure 13:
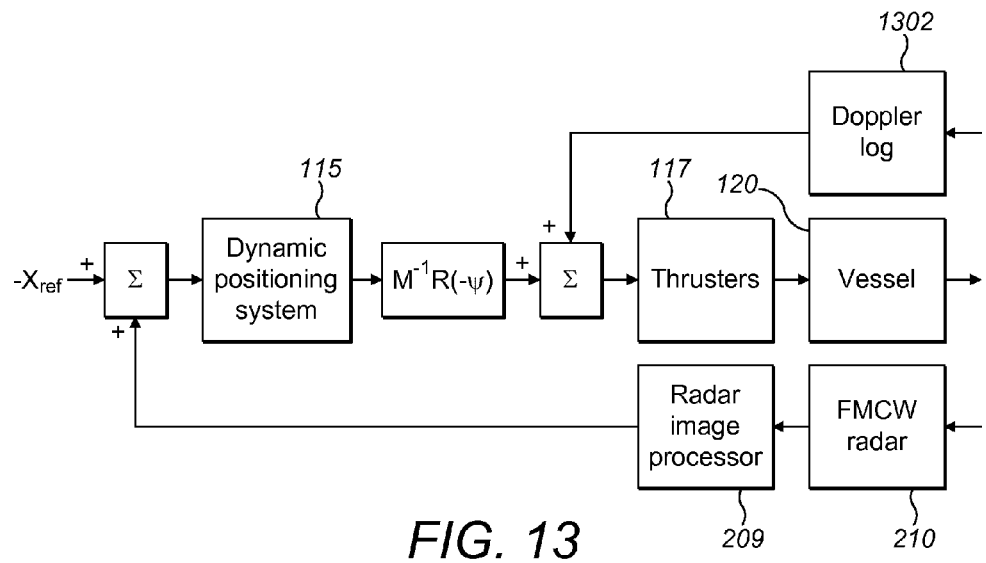
FIG. 13 shows a position-heading control loop.

A position-heading control loop may then be closed as illustrated in FIG. 13, where M is the inertia matrix specified above, $M^{-1}$ is the matrix inverse of M, $R(\psi)$ is the rotation matrix specified above and $R(-\psi)$ is the reverse rotation.

Figure 14:
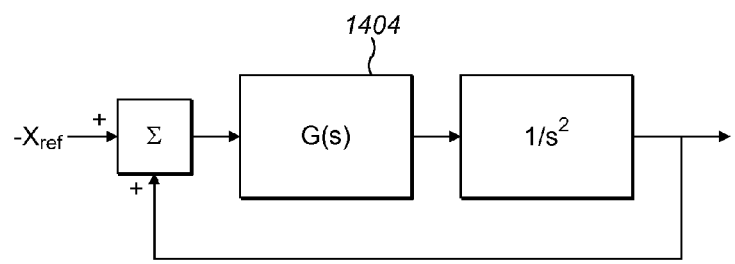
FIG. 14 shows a simplified position-heading control loop.

So with feed-forward to counteract the drag from the water, and assuming that the bandwidth of position control is much less than the bandwidth of control of thrusters 117, the control loop in FIG. 13 reduces to a simple feedback control around a double integrator, as illustrated in FIG. 14, where G(s) is the transfer function 1404 of a controller. Motion of the object 130 acts as a disturbance to the control loops.

Solutions to the problem of feedback control around a double integrator could be obtained using a proportional, integral, differential (PID) loop. The gains of the loop is usually chosen to limit the bandwidth of control to be below the frequency of the waves. Precautions need to be taken to avoid integrator wind-up in the case of actuator saturation. The actuator in this case being the thruster 117 or equivalent.

In the absence of a measurement of speed through the water from a Doppler log 1302, the speed through the water can be estimated by a state observer, such as a Kalman filter.

More sophisticated modelling of the wave motion of the vessel 120 is possible which can enable the vessel 120 to respond quickly to disturbances whilst ignoring repetitive wave motion.

A further disturbance comes into the control loop from wind acting on the vessel 120. Given a model of the effect of wind on the vessel 120, measurements from an anemometer mounted on the vessel 120 can be used to improve position control of the vessel 120.

A more sophisticated dynamic positioning system 115 may be configured to handle the interaction between the thrusters 117, the drag and the inclination of the vessel 120. This would look at all six degrees of freedom of the vessel 120, that is, roll, pitch and heave as well as surge, sway and yaw. Such control may require additional sensors and/or a state observer with additional states. Other possible improvements include robust techniques for handling uncertainty or unmeasured variation in the plant parameters M and D, for example, H-∞.

It has been described how the dynamic positioning system 115 composes a thrust demand vector. This needs to be turned into a thrust demand for each thruster 117 and an angle demand for each azimuth thruster (that is, a thruster comprising an azimuthing motor).

The thrust vector for the vessel 120 is given by:

$$t_u = \sum_i \cos\theta_i t_i,$$

$$t_v = \sum_i \sin\theta_i t_i,$$

$$t_\omega = \sum_i (x_i \sin\theta_i + y_i \cos\theta_i) t_i$$

where $x_i$ and $y_i$ are the position of thruster(i) in the frame of the vessel 120, $\theta_i$ is the orientation of thruster(i) relative to the vessel 120; and $t_i$ is the thrust from thruster(i).

For many thrusters, $\theta_i$ is fixed. For an azimuth thruster, $\theta_i$ can vary through a wide range of angles, although there some forbidden angles.

The thruster allocation task is to choose $\{t_i\}$ for all thrusters and $\{\theta_i\}$ for all azimuth thrusters to give the correct value of $\underline{t}$. This is an over-determined problem. If there are n thrusters, m of which are azimuth thrusters, this gives us (m+n−3) additional degrees of freedom.

A solution to the thruster allocation problem is known, for example from JENSSEN; N. A and REALFSEN; B, "*Power Optimal Thruster Allocation*", Dynamic Positioning Conference, 17-18 Oct. 2006.

For each thruster 117 we have a thrust demand from the thrust allocation calculation performed by the dynamic positioning system. For each azimuthing thruster we also have a direction demand from the dynamic positioning system.

The thrust produced by a thruster 117 is a function of the speed of the thruster 117. An estimate of this function of the speed of the thruster 117 is supplied which enables a speed demand to be calculated from the thrust demand.

Figure 15:
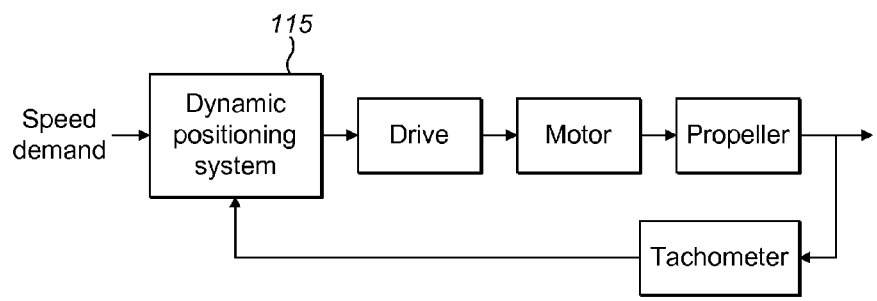
FIG. 15 shows a speed control loop.

The speed control loop is shown in FIG. 15, where the input is the speed demand. The drive, motor and propeller are classed as part of the thruster 117. The speed control loop of FIG. 15 is a conventional speed control problem. It is an inner loop, in the sense that there is another closed loop control outside of the loop in question, so small offset errors are not important, but rapid response is desirable. Consequently an integral term is not normally used and a proportional-differential PD controller may be used. Design of such a controller is known to the person skilled in the art.

Azimuthing thruster direction control is a well known position control loop.

Although the above embodiment has been described with certain preferred features, the skilled person will appreciate that various modifications can be made without departing from the scope of the appended claims. Some of these potential modifications are described below.

Although the RF signal generator 212 has been described as generating a triangular linear frequency-modulation with a centre frequency of 9250 MHz, a frequency sweep of 100 MHz and a sweep time of 2 ms centre frequency, the centre frequency could be in the range of 20 GHz to 30 GHz or 70 GHz to 80 GHz, with a frequency sweep in the range of 100 MHz and 1000 MHz and a sweep time in the range of 3 to 0.5 ms. The applicant has done some work at 24.15 GHz with a frequency sweep of 200 MHz, keeping the sweep time at 2 ms. The main consideration when choosing a frequency and bandwidth is compliance with radio spectrum management regulations. To compare 9 GHz operation with 24 GHz, we are allowed to use a higher transmitter power at 9 GHz, while at 24 GHz we are allowed more bandwidth, hence we get better range resolution. Moving up to 77 GHz would allow us to stretch out into a 1 GHz wide band.

As well as a triangular modulation scheme, other modulation schemes may be used as would be known to the skilled person.

Although the RF signal has been described as being generated by Direct Digital Synthesis, the RF signal could be generated by any other means known to the skilled person, such as a YIG oscillator. The YIG oscillator is more expensive than the DDS scheme. It has different error characteristics, not clearly better or worse.

Although the azimuthal width of the beam 216 has been described as being 3° and the elevation width of the beam 216 has been described as being 12°, the azimuthal width of the beam 216 could be in the range of 0.2° to 7.5°, and the elevation width of the beam 216 could be in the range of 5° to 50°.

The azimuth beam width determines the width of the antenna. A narrower beam requires a wider antenna. A beam width of 3 degrees requires an antenna width of about 20 wavelengths. At 10 GHz this is 0.6 m, which is a convenient size for the sensor. At a higher radio frequency, i.e. shorter wavelength, we get a narrower beam for the same antenna size. This gives better angular resolution. It also requires a faster frequency sweep which in turn increases the computational load.

A workable system could be constructed with a azimuth beam width as large as 7.5 degrees. It would be possible to make a high performance, high cost device with a beam width of 0.5 degrees—or even less if the resolution was worth the trouble and expense.

It is preferable for a receive antenna 205 to have the same beam pattern as the transmit antenna 214. It is also preferable for the receive antenna 205 to have the same polarisation at the transmit antenna 214.

Although in FIG. 5, the FMCW radar is show as being separate from the device 200, the FMCW radar 210 could be integrated into the device 200. Furthermore, the FMCW radar 210 and the device 200 could use a single antenna in place of the separate transmit antenna 214 and receive antenna 205 shown in FIG. 5. When using a single antenna, a circulator is used to isolate the transmission path (that is, the modulated RF signal from the RF signal generator 212) from the reception path (that is, the received signal 218 which is passed to the mixer 206).

Although in the above embodiment, the device 200 is used to control a vessel, which could be any sea going vessel, such as a ship, boat, tanker, ferry or hovercraft, the device 200 could also be used to control a land vehicle, such as a car, van, lorry, truck, bus, coach or motorcycle. Alternatively, the device 200 could be used to control an aircraft, or a submarine.

The object 130 could be any sea going vessel, such as a ship, boat, tanker, ferry or hovercraft, the object 130 may be a land vehicle, such as a car, van, lorry, truck, bus, coach or motorcycle. Alternatively, the object 130 could be an aircraft, or a submarine. Alternatively, the object 130 could be an oil rig, buoy or other platform tethered at sea.

Although the propulsion system on the vessel 120 has been described as a set of azimuth thrusters 117, other types of propulsion system are available, such as, a propeller with rudder and tunnel thrusters. If a propeller is used, propeller pitch may be fixed or variable, and propeller speed may be fixed or variable. The propulsion system is designed based on the size and dimensions of the vessel 120, and requirements regarding maximum speed, fuel efficiency and so on.

Although the device 200 has been described in terms of a rotating FMCW radar, other kinds of radar could be used without the need for significant modifications. Instead of a rotating radar, phased array techniques could be used to scan the scene. We can continuously illuminate the whole scene and use digital beam-forming to produce an image. Pulsed radar can be used instead of an FMCW radar. A LIDAR device incorporating a laser can be used instead of the radar to measure range and bearing to objects in the scene. Sonar could also be used.

Although a Kalman filter has been described, it is possible to use another form of estimator such as a state observer, including a fixed gain state observer and a particle filter.

Throughout the description we refer to targetless tracking. In this context, "target" means a device which has been attached to an object for the purpose of tracking it with a radar (or lidar or sonar), and so targetless means doing so without such a device necessarily being attached to the object to be tracked.

Although the invention is discussed in terms of controlling a separation distance between the device and the object, more generally, the dynamic positioning system can control the positional relationship, such as one or more of the separation distance, the bearing, the aspect angle and the relative orientation, in any combination.

The invention claimed is:

1. A targetless tracking device comprising:
a detector configured to receive scattered radiation indicative of the presence of an object; and
a processor configured to:
calculate a positional relationship between the device and the object based on the scattered radiation;
receive an indication of a desired positional relationship of the detector relative to the object; and
generate an error signal indicative of the positional relationship versus the desired positional relationship so that the device position is able to be controlled to reduce the error signal;

wherein the processor is further configured to calculate the positional relationship by creating first and second images at first and second points in time, respectively, and then comparing the first and second images in order to calculate the positional relationship;

wherein either: the scattered radiation is from a radar and the first and second images are radar images; or the scattered radiation is from a lidar and the first and second images are lidar images.

2. The targetless tracking device of claim 1, wherein the first and second images are compared by scan-matching.

3. The targetless tracking device of claim 2, wherein scan-matching comprises selecting part of the second image based on a predicted location of the object in the second image.

4. The targetless tracking device of claim 3, wherein a prediction error is calculated by optimising a function between the second image and the first image.

5. The targetless tracking device of claim 4, wherein the function is a correlation between the second and first images.

6. The targetless tracking device of claim 3, wherein an estimated change is generated using an estimator such as a state observer, comprising one of a fixed gain state observer, a particle filter and a Kalman filter.

7. The targetless tracking device of claim 6, wherein the estimator takes a current speed of the device as a parameter.

8. The targetless tracking device of claim 2, further comprising adjusting the second image to match the first image.

9. The targetless tracking device of claim 1, wherein creating first and second images comprises calculating a spatial power spectral density of the intensity of the scattered radiation.

10. The targetless tracking device of claim 1, wherein the processor is further configured to select a sub-region of one of the first and second images.

11. The targetless tracking device of claim 10, wherein the processor selects the sub-region so that the object fills a majority of the sub-region.

12. The targetless tracking device of claim 10, wherein the sub-region contains no further object which moves relative to the object.

13. The targetless tracking device of any of claim 10, wherein the processor is further configured to display the sub-region to a user, receive input from the user, and calculate the positional relationship in response to receiving the input from the user.

14. The targetless tracking device of claim 1, wherein the processor is further configured to compare the first and second images in order to calculate one or more of a separation distance, a relative orientation or bearing between the device and the object based on the scattered radiation, and wherein the desired positional relationship is an equivalent one or more of a desired separation distance, desired relative orientation or desired bearing of the detector relative to the object.

15. The targetless tracking device of claim 1, further comprising a dynamic positioning system configured to control a propulsion system to move a vessel towards the desired target distance based on the error signal.

16. A targetless tracking device comprising:
a detector configured to receive scattered radiation indicative of the presence of an object; and
a processor configured to:
calculate a positional relationship between the device and the object based on the scattered radiation;
receive an indication of a desired positional relationship of the detector relative to the object; and
generate an error signal indicative of the positional relationship versus the desired positional relationship so that the device position is able to be controlled to reduce the error signal;
wherein the processor is further configured to calculate the positional relationship by creating first and second images at first and second points in time, respectively, and then comparing the first and second images in order to calculate the positional relationship, wherein the first and second images are compared by scan-matching.

17. A targetless tracking device comprising:
a detector configured to receive scattered radiation indicative of the presence of an object; and
a processor configured to:
calculate a positional relationship between the device and the object based on the scattered radiation;
receive an indication of a desired positional relationship of the detector relative to the object; and
generate an error signal indicative of the positional relationship versus the desired positional relationship so that the device position is able to be controlled to reduce the error signal;
wherein the processor is further configured to:
generate an image of the object based on the scattered radiation;
select a sub-region of the image, the sub-region containing the object;
display the sub-region to a user;
receive input from the user, and in response to receiving the input, calculate the positional relationship by creating first and second images of the sub-region based on the scattered radiation at first and second points in time, respectively, and then comparing the first and second images in order to calculate the positional relationship.

* * * * *

UNITED STATES PATENT AND TRADEMARK OFFICE
CERTIFICATE OF CORRECTION

PATENT NO. : 9,500,746 B2  
APPLICATION NO. : 14/514067  
DATED : November 22, 2016  
INVENTOR(S) : Russell William James Miles It is certified that error appears in the above-identified patent and that said Letters Patent is hereby corrected as shown below:

On the Title Page

Item (72) Change Inventor Name from "Russ Miles" to -- Russell William James Miles --

Item (73) Change Assignee from "Guidance Navigation Limited" to -- Guidance Marine Limited --

Signed and Sealed this
Twenty-sixth Day of June, 2018

Andrei Iancu
*Director of the United States Patent and Trademark Office*